United States Patent [19]

Suzuki et al.

[11] 4,290,686
[45] Sep. 22, 1981

[54] LIQUID CRYSTAL DISPLAY DEVICE FOR CAMERA

[75] Inventors: Ryoichi Suzuki, Kawasaki; Hiroyasu Murakami, Tokyo; Masaharu Kawamura, Kawasaki; Shinji Sakai, Tokyo; Takashi Uchiyama; Kikuo Momiyama, both of Yokohama, all of Japan

[73] Assignee: Canon Kabushiki Kaisha, Tokyo, Japan

[21] Appl. No.: 155,172

[22] Filed: Jun. 2, 1980

[30] Foreign Application Priority Data

May 6, 1979 [JP] Japan .................................. 54-70722

[51] Int. Cl.³ .......................... G09F 9/35; G03B 17/20
[52] U.S. Cl. .................................... 354/289; 340/805; 354/53; 354/60 E
[58] Field of Search .............. 340/753, 765, 784, 805; 354/53, 60 E, 60 L, 289

[56] References Cited

U.S. PATENT DOCUMENTS 4,082,430 4/1978 Schulthess et al. ............. 340/805 X
4,145,129 3/1979 Kawamura et al. ............ 354/289 X
4,177,472 9/1978 Freer et al. ..................... 340/805 X Primary Examiner—Michael L. Gellner
Attorney, Agent, or Firm—Toren, McGeady and Stanger

[57] ABSTRACT

The present invention relates to a liquid crystal cell having a plural number of electrode pairs arranged on both sides of the liquid crystal matter so as to be opposed to each other, being characterized in that a pulse wave generating device for generating the first pulse wave with smaller amplitude than the threshold value for lighting the liquid crystal and the second pulse wave with larger amplitude than the threshold value for lighting the liquid crystal in reversed phase to each other and a gate device for selectively applying the outputs of the pulse wave generating device to each electrode of the liquid crystal cell in accordance with the input signal are provided. Thus, only the voltage between the selecting electrodes is higher than the threshold value. An input change over device is provided so as to change over the input signal group in a time dividing way in such a manner that a plural number of dots can be displayed visually at the same time. As a result, the wiring is simplified.

8 Claims, 37 Drawing Figures

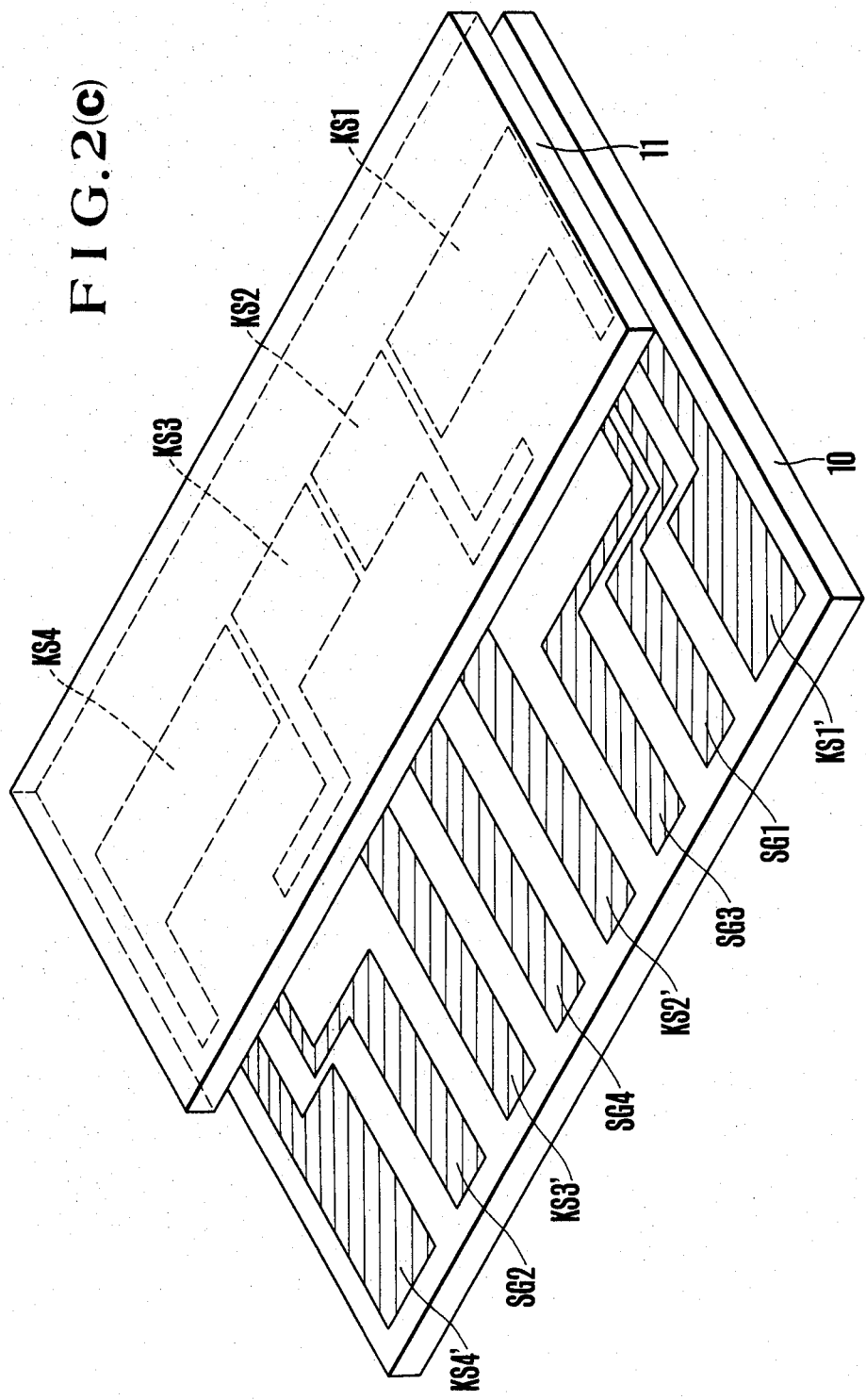

FIG.3(b)

| DECODER OUTPUT | KS1 | KS2 | KS3 | KS4 | SG1 | SG2 | SG3 | SG4 | DOT TO BE LIT |
|---|---|---|---|---|---|---|---|---|---|
| S1  | L2 | L1 | L1 | L1 | L4 | L3 | L3 | L3 | D1 |
| S2  | L2 | L1 | L1 | L1 | L3 | L4 | L3 | L3 | D2 |
| S3  | L2 | L1 | L1 | L1 | L3 | L3 | L4 | L3 | D3 |
| S4  | L2 | L1 | L1 | L1 | L3 | L3 | L3 | L4 | D4 |
| S5  | L1 | L2 | L1 | L1 | L3 | L3 | L3 | L4 | D5 |
| S6  | L1 | L2 | L1 | L1 | L3 | L3 | L4 | L3 | D6 |
| S7  | L1 | L2 | L1 | L1 | L3 | L4 | L3 | L3 | D7 |
| S8  | L1 | L2 | L1 | L1 | L4 | L3 | L3 | L3 | D8 |
| S9  | L1 | L1 | L2 | L1 | L4 | L3 | L3 | L3 | D9 |
| S10 | L1 | L1 | L2 | L1 | L3 | L4 | L3 | L3 | D10 |
| S11 | L1 | L1 | L2 | L1 | L3 | L3 | L4 | L3 | D11 |
| S12 | L1 | L1 | L2 | L1 | L3 | L3 | L3 | L4 | D12 |
| S13 | L1 | L1 | L1 | L2 | L3 | L3 | L3 | L4 | D13 |
| S14 | L1 | L1 | L1 | L2 | L3 | L3 | L4 | L3 | D14 |
| S15 | L1 | L1 | L1 | L2 | L3 | L4 | L3 | L3 | D15 |
| S16 | L1 | L1 | L1 | L2 | L4 | L3 | L3 | L3 | D16 |

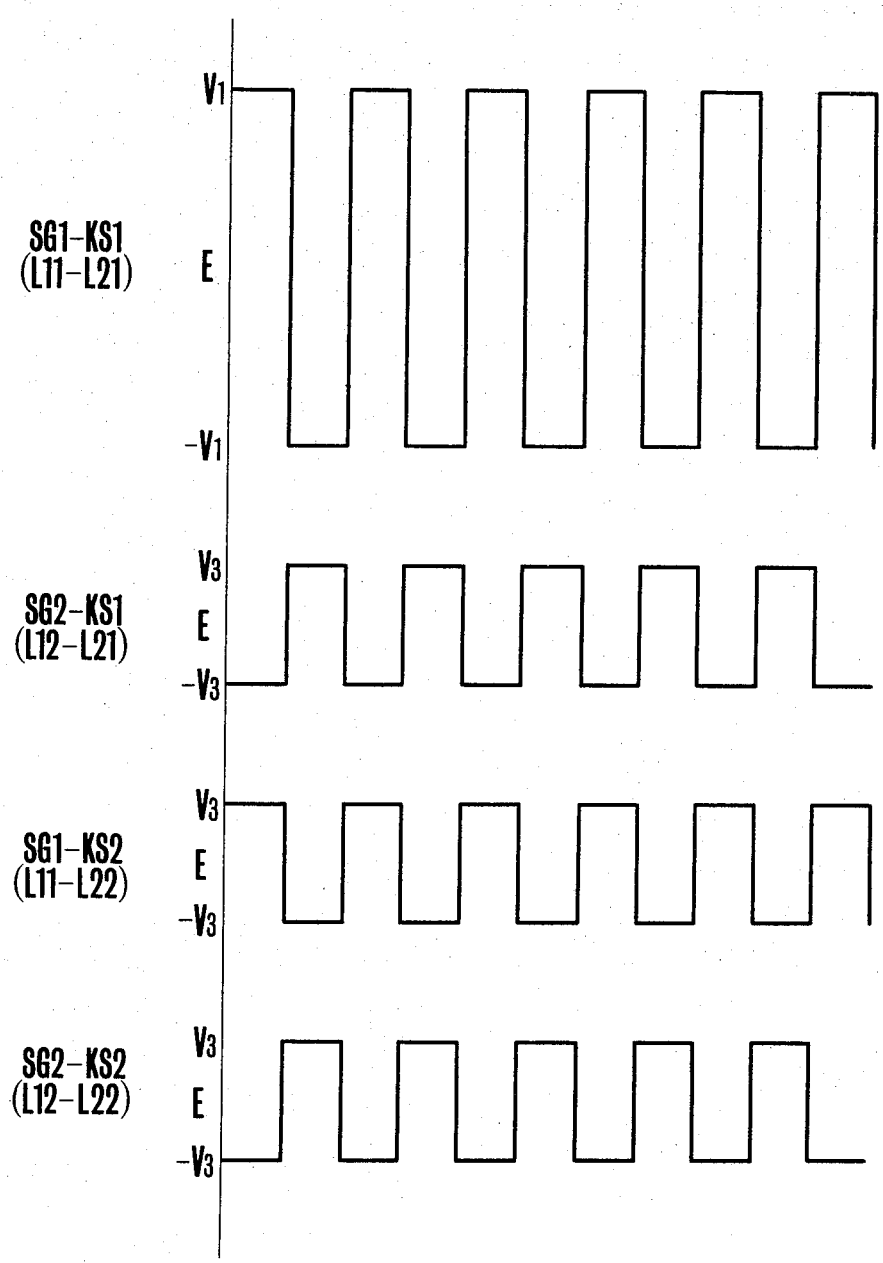

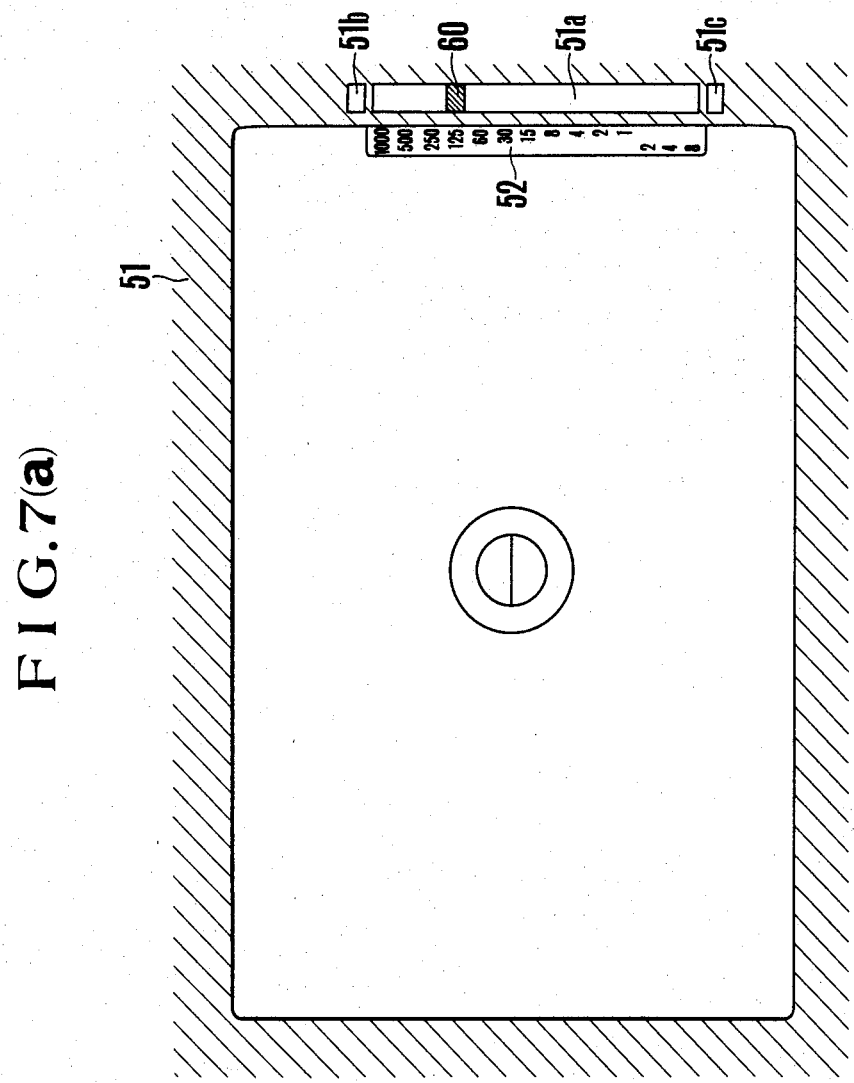

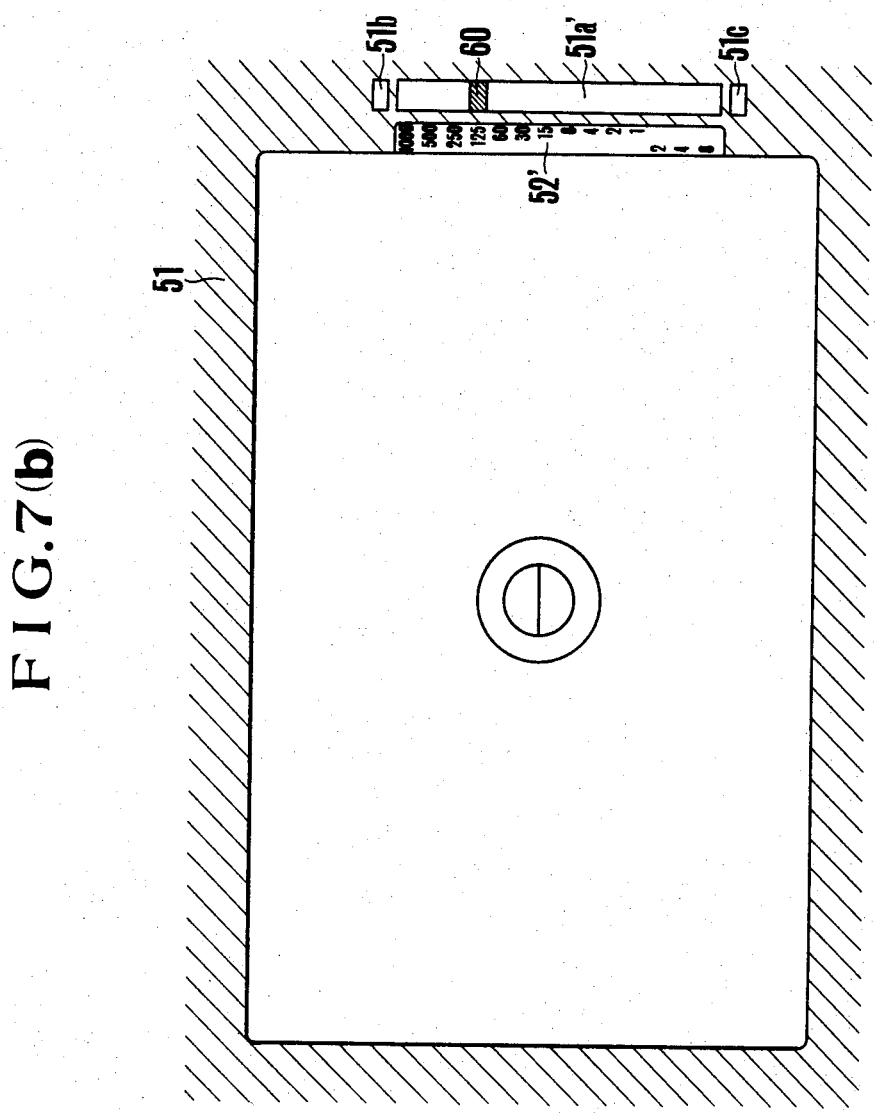

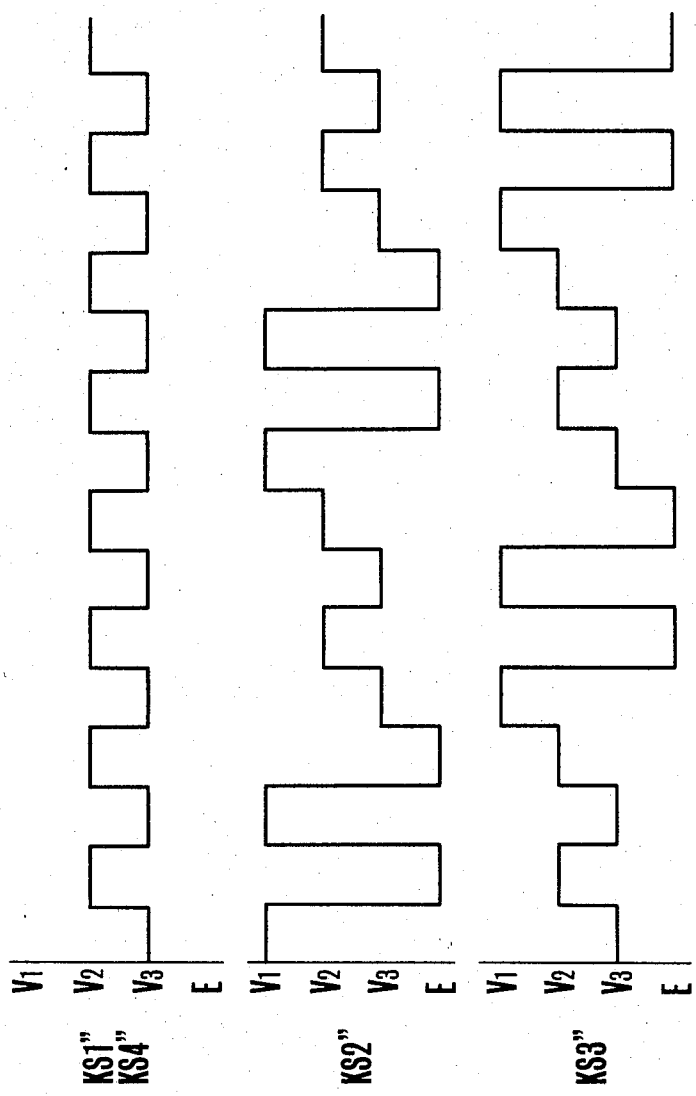

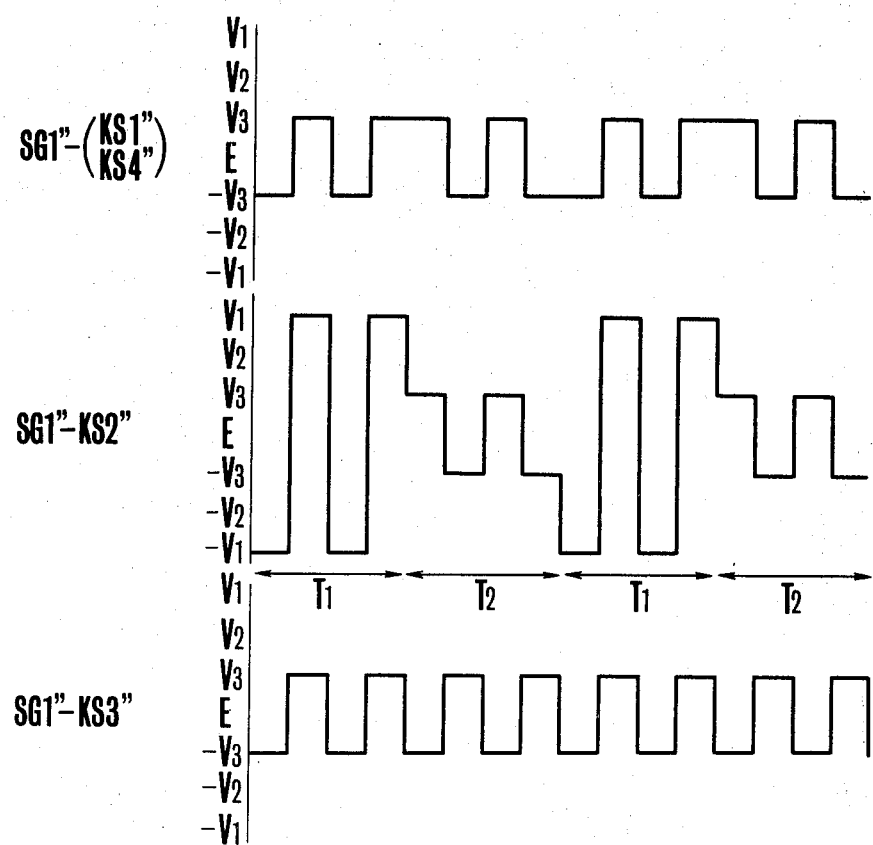
FIG.12 (C-1)

F I G.12(c-2)
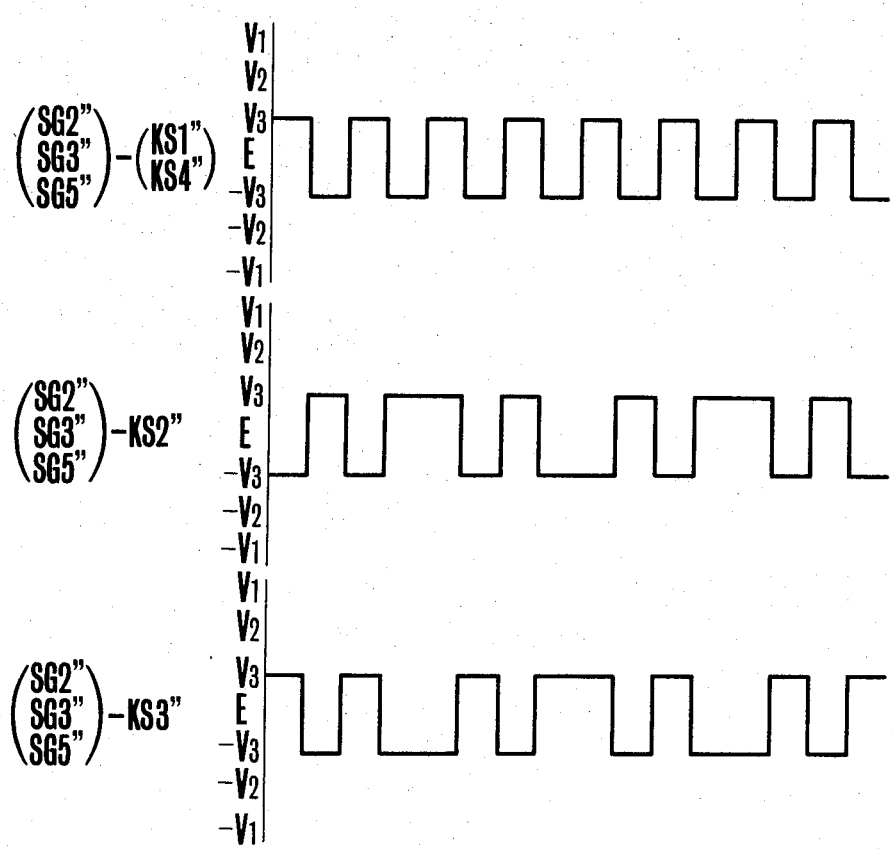

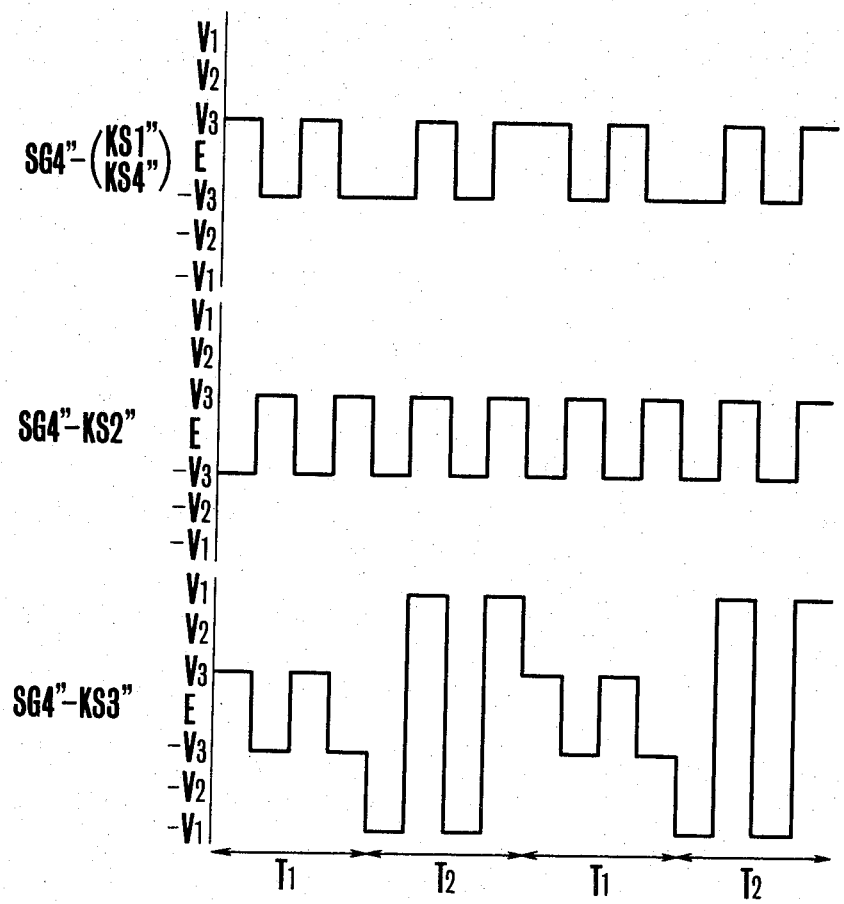
FIG.12 (c-3)

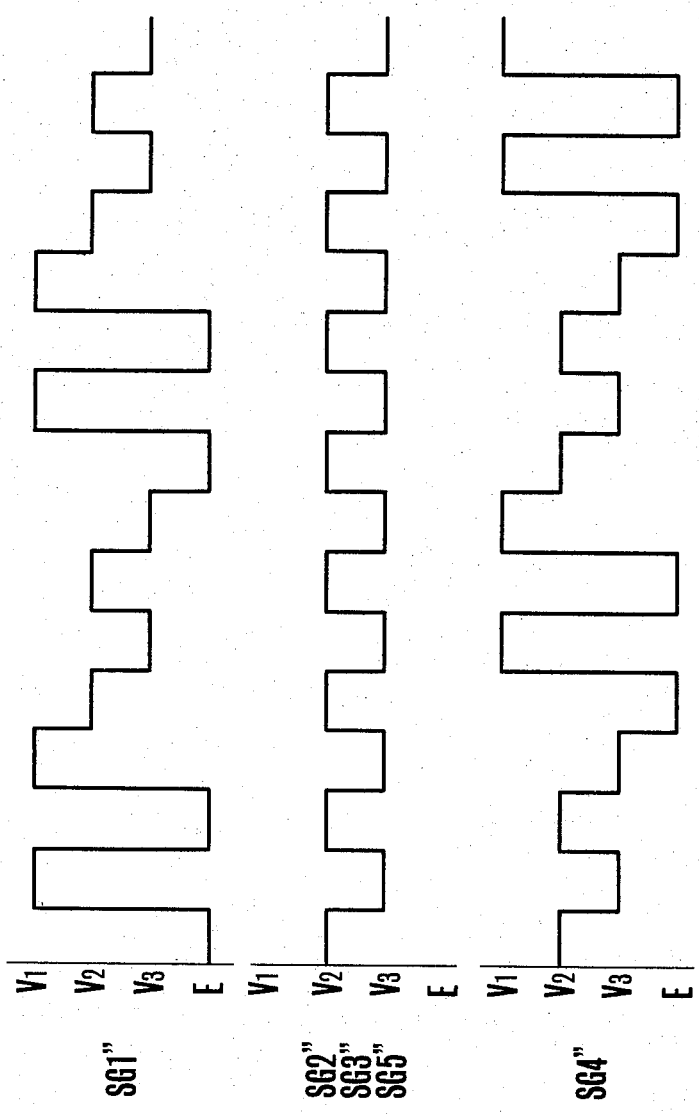

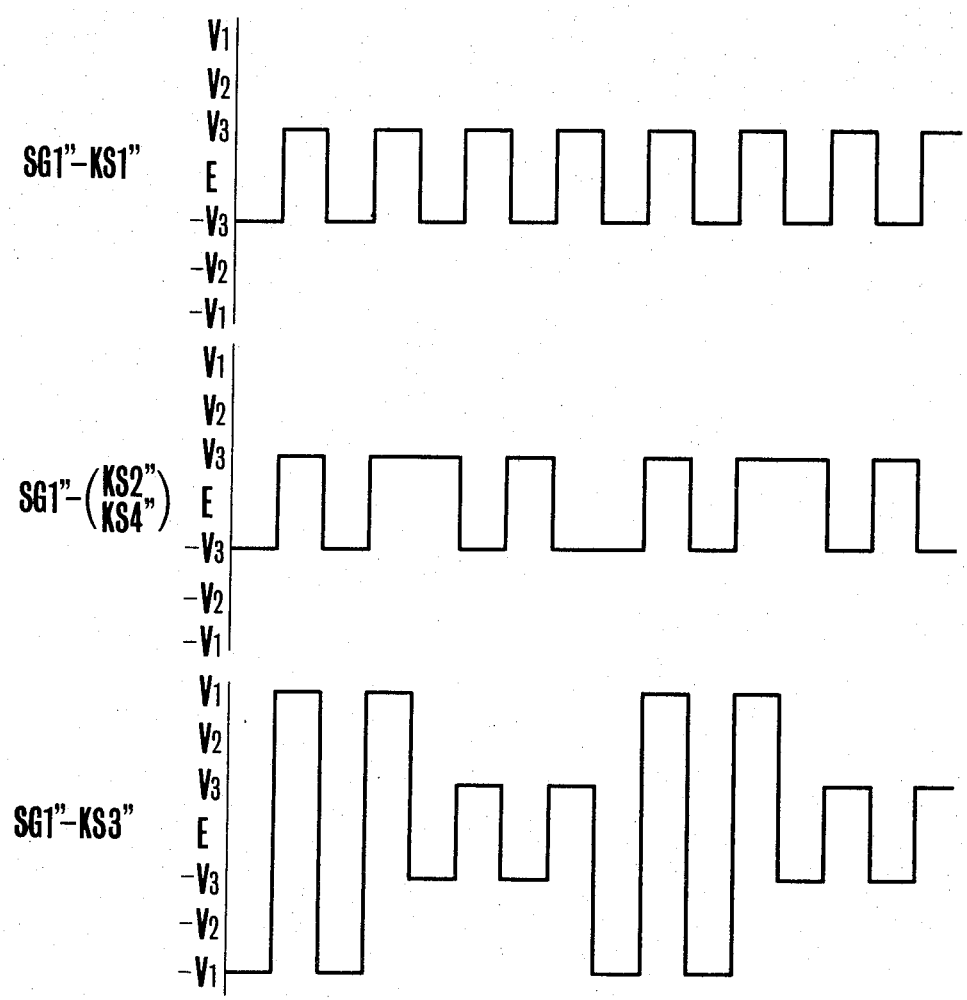
FIG.13 (C-1)

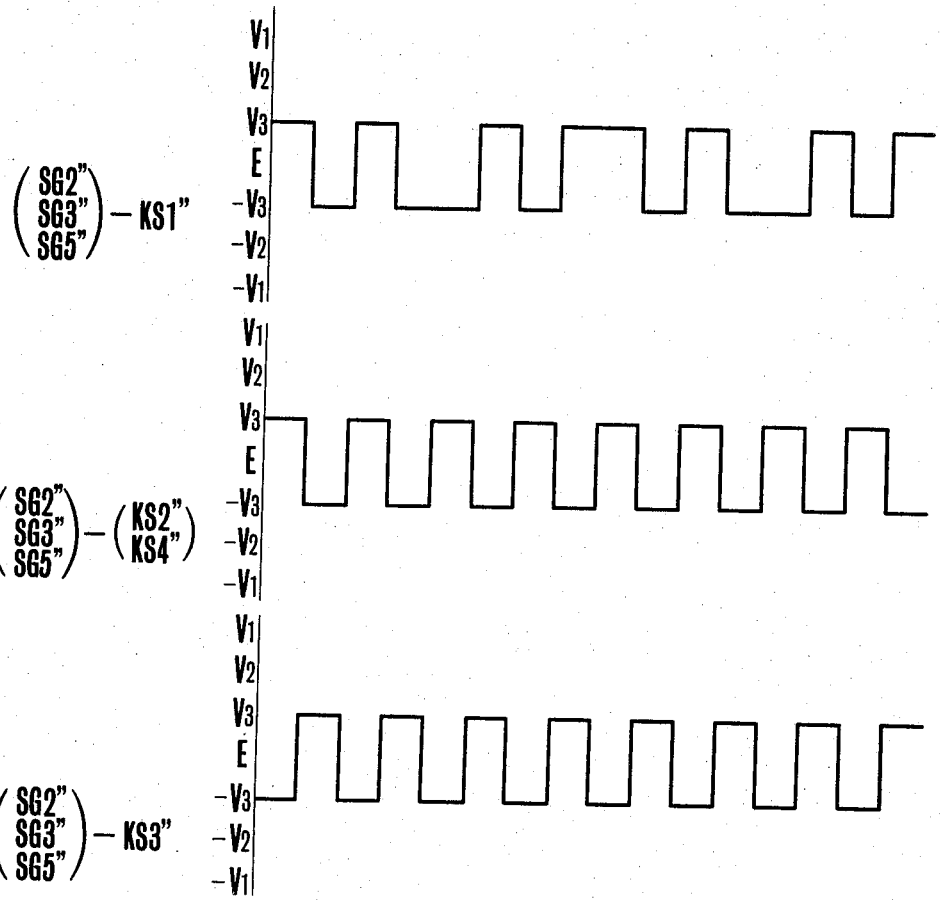
FIG.13 (c-2)

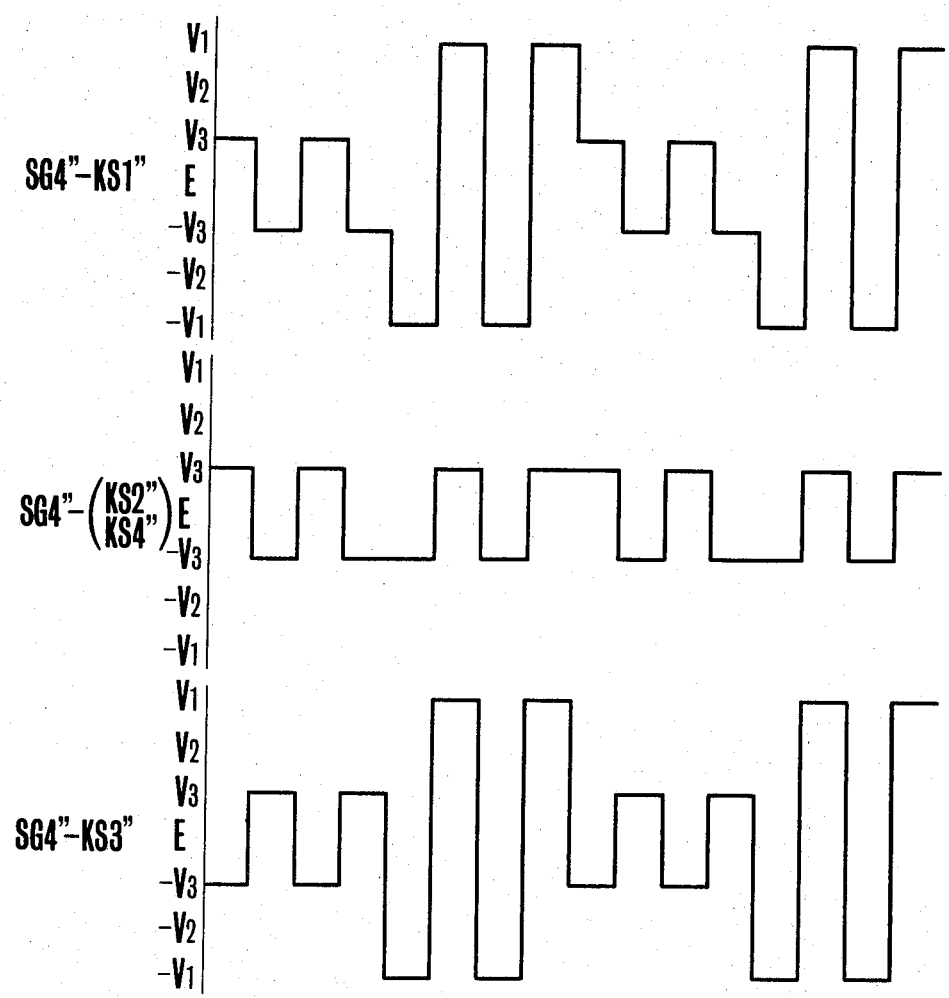
FIG.13(C-3)

F I G.15(a)

$(T=L, \bar{T}=H)$

| PHOTOGRA-PHING MODE | MAIN CONDENSER | SHUTTER TIME | A1 | A2 | A3 | A4 | B1 | B2 | KS1" | KS2" | KS3" | KS4" | SG1" | SG2" | SG3" | SG4" | SG5" | DOT TO BE LIT |
|---|---|---|---|---|---|---|---|---|---|---|---|---|---|---|---|---|---|---|
| AUTO-MATIC | CHARGE COMPLETED | HS | H | H | H | L | H | L | L4 | L4 | L4 | L3 | L1 | L1 | L1 | L2 | L1 | D14, D15, D16 |
| AUTO-MATIC | CHARGE NOT YET COMPLETED | HS | L | L | H | L | H | L | L3 | L3 | L4 | L3 | L1 | L1 | L1 | L2 | L1 | D16, |
| AUTO-MATIC | CHARGE NOT YET COMPLETED | LS | L | L | L | H | L | H | L3 | L3 | L3 | L4 | L1 | L1 | L1 | L1 | L2 | D17, |
| MANUAL | CHARGE COMPLETED | HS | H | H | H | H | H | L | L4 | L4 | L4 | L4 | L1 | L1 | L1 | L2 | L1 | D1, D14, D15, D16 |
| MANUAL | CHARGE NOT YET COMPLETED | HS | L | L | H | H | H | L | L3 | L3 | L4 | L4 | L1 | L1 | L1 | L2 | L1 | D16, D17, D1 |
| MANUAL | CHARGE NOT YET COMPLETED | LS | L | L | L | H | H | H | L3 | L3 | L3 | L4 | L1 | L1 | L1 | L1 | L2 | D1, D17 |

FIG.15(b)

($T = H, \bar{T} = L$)

| | KS1" | KS2" | KS3" | KS4" | SG1" | SG2" | SG3" | SG4" | SG5" | DOT TO BE LIT |
|---|---|---|---|---|---|---|---|---|---|---|
| S1 | L3 | L3 | L3 | L4 | L2 | L1 | L1 | L1 | L1 | D2 |
| S2 | L3 | L3 | L3 | L4 | L1 | L2 | L1 | L1 | L1 | D3 |
| S3 | L3 | L3 | L3 | L4 | L1 | L1 | L2 | L1 | L1 | D4 |
| S4 | L3 | L3 | L4 | L3 | L1 | L1 | L1 | L1 | L1 | D5 |
| S5 | L3 | L3 | L4 | L3 | L2 | L2 | L1 | L1 | L1 | D6 |
| S6 | L3 | L3 | L4 | L3 | L2 | L1 | L2 | L1 | L1 | D7 |
| S7 | L3 | L4 | L3 | L3 | L1 | L1 | L1 | L1 | L1 | D8 |
| S8 | L3 | L3 | L3 | L3 | L1 | L2 | L1 | L1 | L1 | D9 |
| S9 | L3 | L3 | L3 | L3 | L1 | L1 | L2 | L1 | L1 | D10 |
| S10 | L4 | L3 | L3 | L3 | L1 | L1 | L1 | L1 | L1 | D11 |
| S11 | L4 | L3 | L3 | L3 | L1 | L1 | L1 | L1 | L1 | D12 |
| S12 | L4 | L3 | L3 | L3 | L2 | L1 | L1 | L1 | L1 | D13 |

LIQUID CRYSTAL DISPLAY DEVICE FOR CAMERA

BACKGROUND OF THE INVENTION

The present invention relates to the construction and the driving device for the liquid crystal display device for camera.

Until now, for use as a display device in the view finder in an optical photographing device such as a camera, the finger of the ampere meter, the LED and so on are made use of. However, the ampere meter has substantial disadvantages in that it is sensitive to mechanical shock, much space is needed for its arrangement and, within the camera, further, strict dust-proofing is needed. On the other hand, when an LED is made use of, regardless of the 7 segment display or the dot system display, it is necessary to use many LED elements the LED power consumption is very substantial and represents a large load for a small battery such as a silver oxide battery used in a camera. Further, the LED is difficult to look at under high brightness, which is inconvenient.

On the other hand, for use as the display device in such view finders as mentioned above, various segment display device employing liquid crystal have so far been proposed. In this case, the power consumption of the liquid crystal display device is remarkably small as compared with that of the LED and the display device itself by means of the liquid crystal is compact and needs little space, which is convenient. On the other hand, in the case of the display device using liquid crystal, as few as only 4 figures can be driven in accordance with the dynamic drive system and, further, the ratio of the effective voltage at the selecting point to that at the non-selecting point is so small that there exists a danger that possibility of the misoperation due to temperature variation should be increased. On the other hand, in the case of the static drive system there is no such weak point as mentioned above, but the wiring is very complicated, which also inconvenient.

Further, especially when the display device employing liquid crystal is used in the view finder for an optical photographing device such as camera, unless it is arranged in line, substantial space could be needed, whereby the 7 segment display is put aside.

Although in this case, the dot system display is most suited for displaying the photographing informations, in order to carry out the dot system display by means of the lined liquid crystal cell in accordance with the conventional method many problems need to be solved.

SUMMARY OF THE INVENTION

An object of the present invention is to overcome the above-mentioned disadvantages.

Another object of the present invention is to offer a display device for a camera, which is resistant to mechanical shock requires small space for arrangement, has high accuracy and consumes little power.

Further, another object of the present invention is to offer a liquid crystal display device for a camera, which is so designed that misoperation possibly is small and the wiring is greatly simplified as compared with the conventional method.

Further, another object of the present invention is to offer a liquid crystal display device which is so designed as to be suited to be arranged of the view finder in the camera.

Further another object of the present invention is to offer a liquid crystal display device so designed that in the view finder of the camera a plural number of the liquid crystal parts can be lit visually at the same time, while the wiring is simplified.

In accordance with an embodiment of the present invention, a pulse wave generating means for generating the first pulse wave with smaller amplitude than the threshold value for lighting the liquid crystal and the second pulse wave with larger amplitude than the threshold value for lighting the liquid crystal in reversed phase to each other and a gate means for selectively applying the outputs of the pulse wave generating means to each electrode of the liquid crystal cell in accordance with the input signal are provided, whereby only the voltage between the selecting electrodes is higher than the threshold value, while an input change over means is provided so as to change over the input signal group in a time dividing way in such a manner that a plural number of dots can be displayed visually at the same time, whereby the wiring is simplified.

Further, by selecting the ratio of the potential to be applied between the electrodes at the selecting point in the liquid cell to that to be applied between the electrodes at the non-selecting points to be 3:1, the misoperations can be reduced.

Further, in the case of the crystal liquid cell so designed as in the case of the embodiment, the terminals of the electrodes can all be arranged at one side of the liquid crystal display device, the wiring can be simplified in such a manner that when the device is used as a display device in the view finder of the optical instrument such as a camera, there are no obstacles in the view field.

Further, the display, which is of a dot system, is very suitable for displaying the photographing informations in the view finder of the optical instrument such as a camera. Namely, the photographing informations are displayed in dots so that they can be detected quickly by means of feeling, which is especially effective for the photographing for which the timing is of importance.

Further, the liquid crystals are arranged in line, so that, as a display device, it needs small space in the view finder, while it is convenient for displaying the photographing informations which vary in a stepped way.

BRIEF DESCRIPTION OF THE DRAWINGS

FIG. 2(c) shows the liquid crystal cell in perspective view.

FIG. 3(b) is for explaining the operation of the circuit.

FIGS. 4(a)-(d) respectively show the voltage wave forms to be applied to the respective electrodes in an embodiment of the circuit.

FIG. 7(a) shows the liquid crystal display device shown in FIG. 6(a) for explaining the display state in the view finder.

FIG. 7(b) shows the liquid crystal display device shown in FIG. 6(b) for explaining the display state in the view finder.

FIGS. 15(a) and (b) are for explaining the dot portions of the liquid crystal to be lit in various operation mode of the circuits shown in FIGS. 9(a) and (b).

DESCRIPTION OF THE PREFERRED EMBODIMENTS

Below, the present invention will be explained in detail in accordance with the embodiments.

Figure 1A:
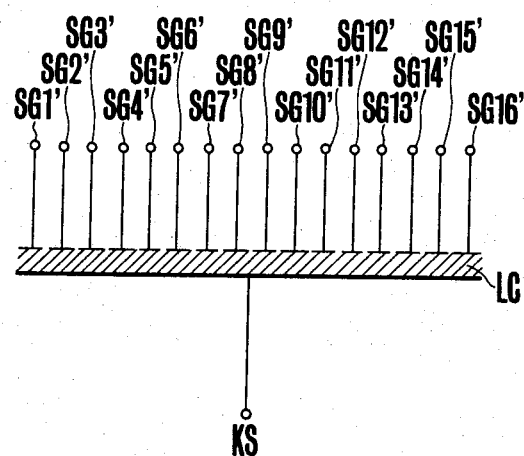
FIG. 1(a) shows the basic construction of the present invention.

FIGS. 1(a) and (b) are drawings for explaining the principle of the dot system liquid crystal display device driving method by means of the static driving. In FIG. 1(a), KS is the common transparent electrode provided on the one basic plate of the liquid cell, while SG1'-SG16' are the divided transparent electrodes provided on the other basic plate, whereby each divided electrode is provided with one wiring. As is clear from the drawing, when the conventional dot system liquid crystal cell of the static driving each divided electrode 1 is provided with one wiring, so that for example 17 (=16+1) wirings are used for the 16 dot display.

Figure 1B:
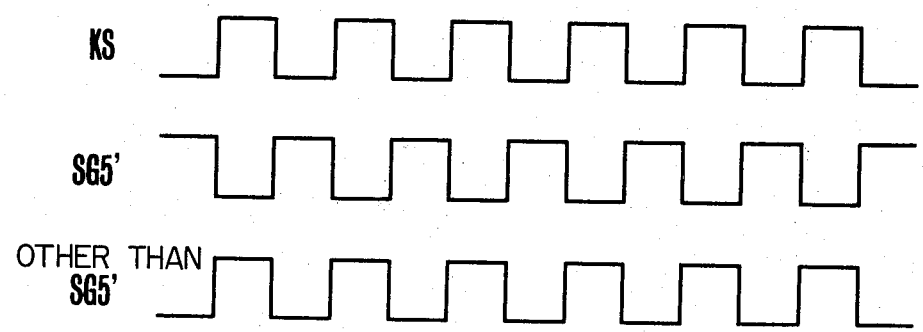
FIG. 1(b) shows the pulse wave forms to be applied to the electrodes in FIG. 1(a).

Further, when in the case of the static drive system shown in FIG. 1, for example, only the divided transparent electrode SG5' is selected to be lit while others are not lit, as is shown in FIG. 1(b), the phase of the pulse voltage to be applied to the divided transparent electrode SG5' is to be reversed to that of the pulse voltage to be applied to the common transparent electrode KS, while the phase of the pulse voltage to be applied to other divided transparent electrodes is to be same as that of the pulse voltage to be applied to the common transparent electrode KS. In this way, only the liquid crystal at the position of the electrode SG5' is selected to be lit.

Figure 2A:
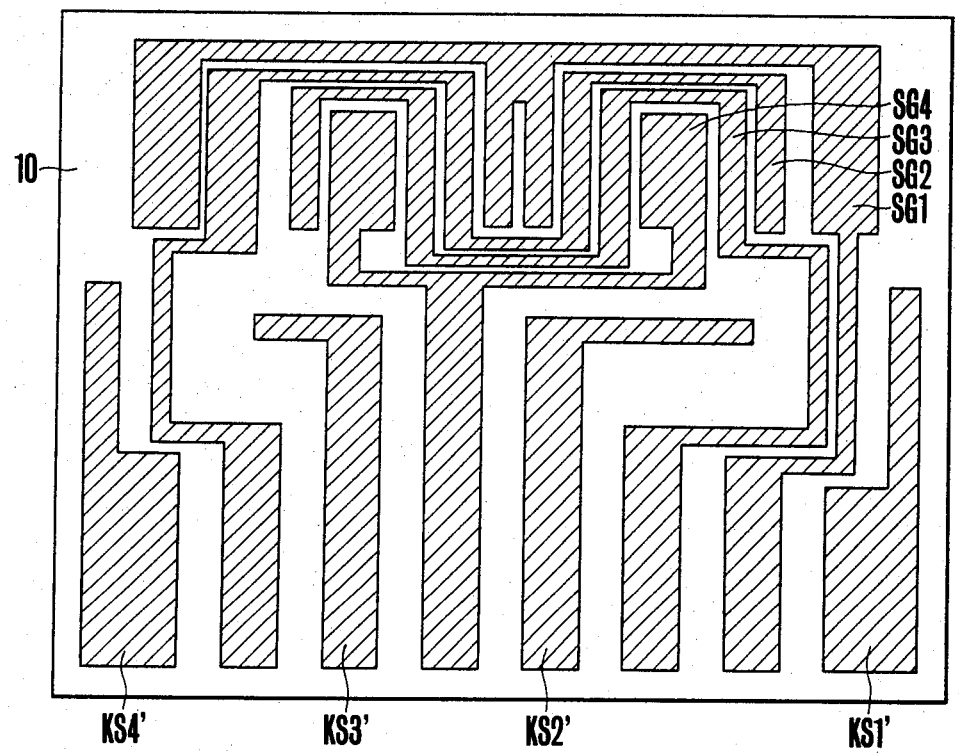
FIG. 2(a) shows an example of the arrangement of the electrodes on the first base plate of the liquid crystal cell.

FIGS. 2 to 7 show the construction and the operation diagram of the first embodiment of the present invention, whereby FIG. 2(a) shows an example of the construction of the transparent electrode for the first basic plate. 10 is the transparent glass basic plate, SG1-SG4 the transparent segment electrodes and KS1'-KS4' the transparent electrodes. These electrodes consist of for example $In_2O_3$ doped with $SnO_2$, being formed on the above transparent glass plate 10 for example, by means of vacuum metallization so as to be conductive.

Figure 2B:
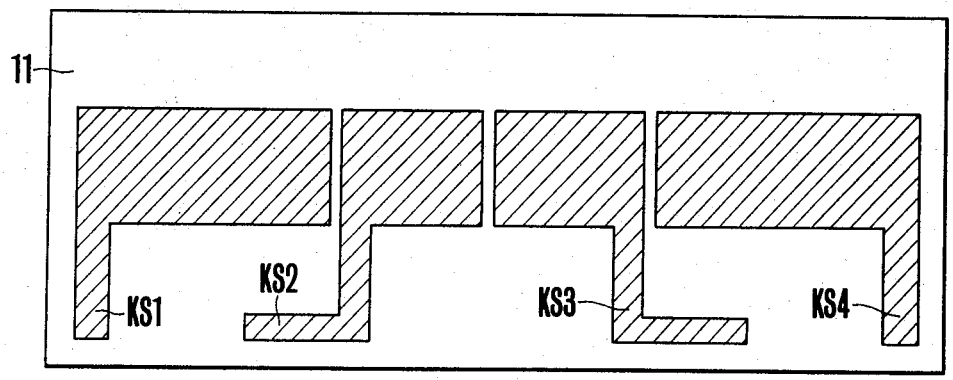
FIG. 2(b) shows an example of the arrangement of the electrodes on the second base plate of the liquid crystal cell.

FIG. 2(b) shows an example of the transparent electrodes formed on the second basic plate, whereby 11 is the transparent glass basic plate and KS1-KS4 are the transparent common electrodes, which also consist of for example $In_2O_3$ doped with $SnO_2$, being formed on the above transparent glass plate 11 for example by means of vacuum metallization so as to be conductive.

FIG. 2(c) shows the transparent glass basic plates 10 and 11 opposed to each other in perspective view. Hereby, the conventional material to be filled between the transparent glass base plates 10 and 11, the spacer for covering them and the two conventional polarization plates to be arranged so as to sandwich the aforementioned cell are eliminated.

To the basic plate shown in FIG. 2(a), the basic plate shown in FIG. 2(b) is arranged to be opposed in a reversed position, whereby to each of the wide portions of the transparent electrodes KS1-KS4 four of the transparent segment electrodes SG1-SG4 are arranged to be opposed. In this way, 16 parts opposed to each other in rows are formed.

Further, in FIG. 2(c), the transparent electrodes KS1-KS4' on the basic plate 10 are respectively connected to the transparent common electrodes KS1-KS4 on the basic plate 11 electrically. As is constructed as above, the liquid crystal cell and the driving circuit can be connected to each other at the left end at this side of the transparent glass plate 10 shown in FIG. 2(c), whereby the number of the terminals is only 8, which is convenient for assembling.

Figure 3A:
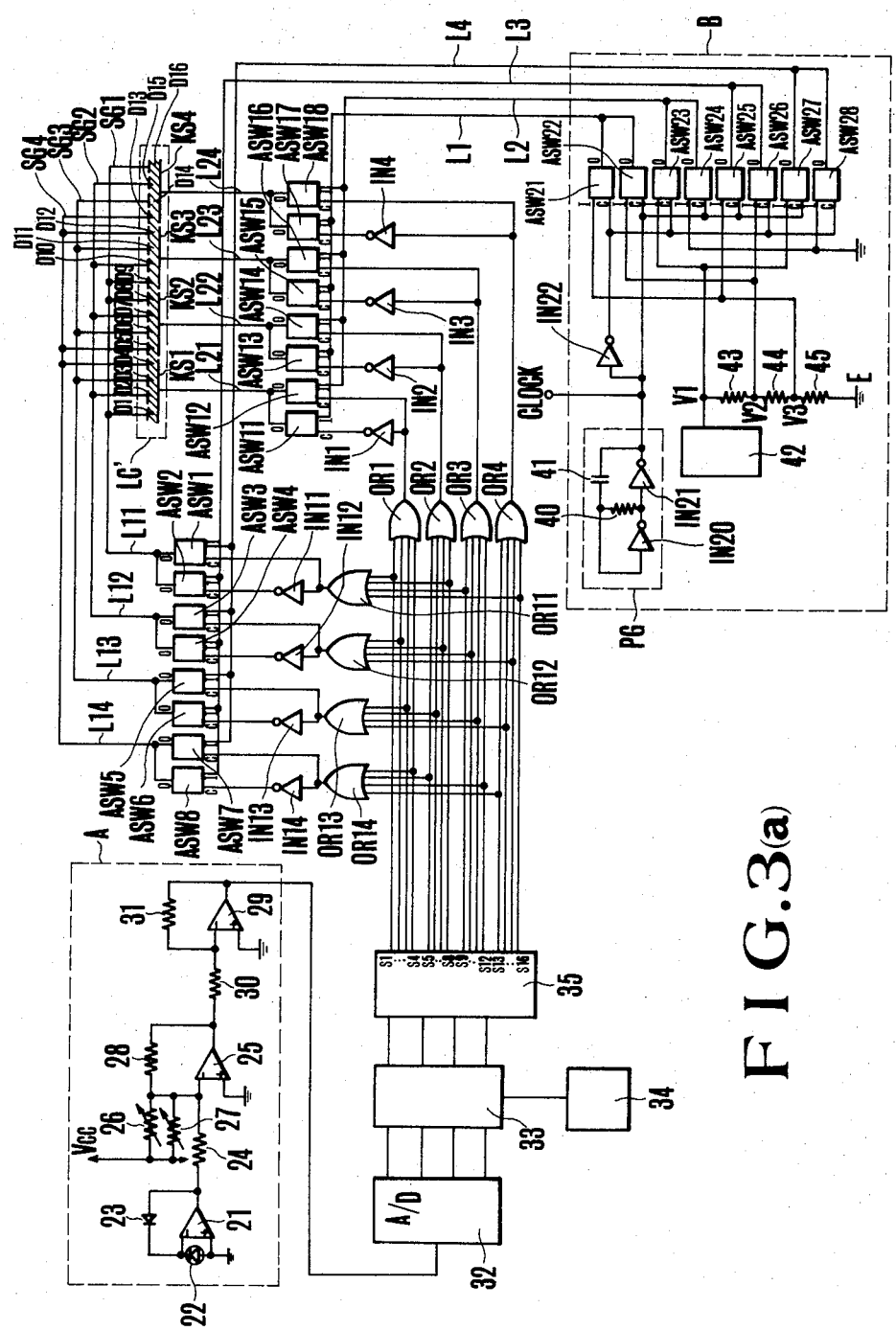
FIG. 3(a) shows an example of the driving circuit for the liquid crystal cell shown in FIGS. 2(a)-(c).

FIG. 3(a) shows an example of the driving circuit of the liquid crystal cell. In the drawing, A is the light measurement calculation circuit block, whereby 21 is the operational amplifier constituting the SPC head amplifier, 22 is the SPC (silicone Photo Cell) connected between the two input terminals of the operational amplifier and 23 is the logarithmically compressing diode connected in the negative feed back circuit. 25 is the operational amplifier constituting an adder, whose non-inverting input terminal is grounded and whose inverting input terminal is connected to the output of the above operational amplifier 21 through the resistance 24. 26 and 27 are respectively variable resistances for setting the ASA sensitivity information and that for presetting the aperture value information, and 28 is the resistance to be inserted in the negative feed back circuit of the above operational amplifier 25. 29 is the operational amplifier for constituting an inverting amplifier, whose non-inverting input terminal is grounded and whose inverting input terminal is connected to the output of the above operational amplifier 25 through the resistance 30. 31 is the negative feed back resistance.

32 is the conventional A/D (analog to digital) converter for converting the analog output voltage of the above operational amplifier 29 into a 4 bit binary code. 33 is the latch circuit for latching the 4 bit input binary code in accordance with the pulse output of the pulse generating circuit 34. The latching time is set for example 0.5 second. 35 is the conventional decoder for converting the 4 bit input binary code into a decimal code. OR1-OR4 are respectively the 4 input OR gates, whereby to OR1, the outputs 1-4 of the decoder 35 are connected, to OR2 the outputs 5-8, to OR3 the outputs 9-12 and to OR4 the outputs 13-16 are connected, respectively. OR11-OR14 are also OR gates, whereby to OR11 the outputs 1, 8, 9 and 16 of the decoder 35 are connected, to OR12 the outputs 2, 7, 10 and 15, to OR13 the outputs 3, 6, 11 and 14, and to OR14 the outputs 4, 5, 12 and 13 are connected, respectively.

In1-IN4 are respectively the inverting circuits connected to the outputs of the above gates OR1-OR4, and IN11-IN14 the inverting circuits connected to the outputs of the above gates OR11-OR14.

ASW1-ASW8 are the analog switches, the control inputs C of ASW1, ASW3, ASW5 and ASW7 out of which are respectively connected to the outputs of the above or gates OR11-OR14. Further, the control inputs C of ASW2, ASW4, ASW6 and ASW8 are respectively connected to the outputs of the above inverting circuit IN11-IN14. ASW11-ASW18 are also the analog switches, the control inputs C of ASW11, ASW13, ASW15 and ASW17 out of which are respectively connected to the outputs of the above inverting circuits IN1-IN4. Further, the control inputs C of the analog switches ASW12, ASW14, ASW16 and ASW18 are respectively connected to the outputs of the above OR gates OR1-OR4. Hereby, the analog switches, the inverters and the OR gates constitute a gate means as a whole.

42 is the constant voltage generating circuit, to whose output the voltage dividing resistances 43, 44 and 45 with the same are connected in series. Now, let us call the output voltage of the constant voltage generating circuit 42, V1, the voltage at the connecting point of the resistance 43 with 44, V2, that at the connecting point of 44 with 45, V3, and the ground level as standard voltage, E.

IN22 is the inverting circuit connected to the output of the pulse generating circuit block PG, which consists of the inverters IN20 and IN21 and the resistance 40 and the condenser 41. As is shown in the drawing, between the output terminal and the input terminal of the inverter IN20 the resistance 40 is connected, whereby the output terminal of the inverter IN20 and the input terminal of the inverter IN21 are connected to each other. Further, the output terminal of the inverter IN21 is connected to the input terminal of the inverter IN20 through the condenser 41. Further, it is so adjusted that at the output terminal of the above inverter IN21 pulses with repeated frequency of for example 200 Hz are produced.

ASW21-ASW28 are the analog switches, whereby V3 is applied to the input terminals I of ASW21 and ASW25, V2 to the input terminals I of ASW22 and ASW26, V1 to the input terminals I of ASW23 and ASW27 and for example E as standard voltage to the input terminals I of ASW24 and ASW28.

Further, the control input terminals C of the analog switches ASW22, ASW24, ASW25 and ASW27 out of ASW21-ASW28 are connected to the output terminal of the above pulse generating circuit block PG and the control input terminals C, ASW21, ASW23, ASW26 and ASW28 to the output terminal of the above inverting circuit IN22. Further, the output terminals of the analog switches ASW21 and ASW22 are connected to the all input terminals I of ASW11, ASW13, ASW15 and ASW17, while the output terminals O of ASW23 and ASW24 are connected to the all input terminals I of ASW12, ASW14, ASW16 and ASW18.

The output terminals O of the analog switches ASW25 and ASW26 are connected to the all input terminals I of ASW2, ASW4, ASW6 and ASW8, while the ouput terminals O of ASW27 and ASW28 are connected to the all input terminals I of ASW1, ASW3, ASW5 and ASW7.

Consequently, the block B can be said to be a pulse generating block, which produces 4 kinds of pulses, namely with two different amplitudes in normal and reversed phases. Namely, on the line L1 and voltages V3 and V2 appear alternatively, on the line L2, V1 and E, on the line L3, E with same amplitude as that on L1 and in the reversed phase to that on L1, and on the line L4 an alternating voltage with the same amplitude as that on L2 but in the reversed phase to that on L2.

Now, let us call the alternating voltage with amplitude V1 on the line L2 the first normal phase alternating voltage, the one with the amplitude V3 on the line L1 the second reversed phase alternating voltage, the one with the amplitude V3 on the line L3 the second normal phase alternating voltage, and the one with the amplitude V1 on the line L4 the first reversed phase alternating voltage.

LC' is the liquid crystal display device shown in FIGS. 2(a) and (b), whereby the common electrode KS1 out of KS1-KS4 provided on the one basic plate of the liquid crystal display device LC' is connected to the two output terminals O of ASW11 and ASW12, KS2 to the two output terminals O of ASW13 and ASW14, KS3 to the two output terminals O of ASW15 and ASW16 and KS4 to the two output terminals O of ASW17 and ASW18.

The segment electrode SG1 out of SG1-SG4 provided on the other basic plate of the liquid crystal display device LC' is connected to the two output terminals O of ASW1 and ASW2, SG2 to the two output terminals O of ASW3 and ASW4, SG3 to the two output terminals O of ASW5 and ASW6, and SG4 to the two output terminals O of ASW7 and ASW8.

Figure 4A:
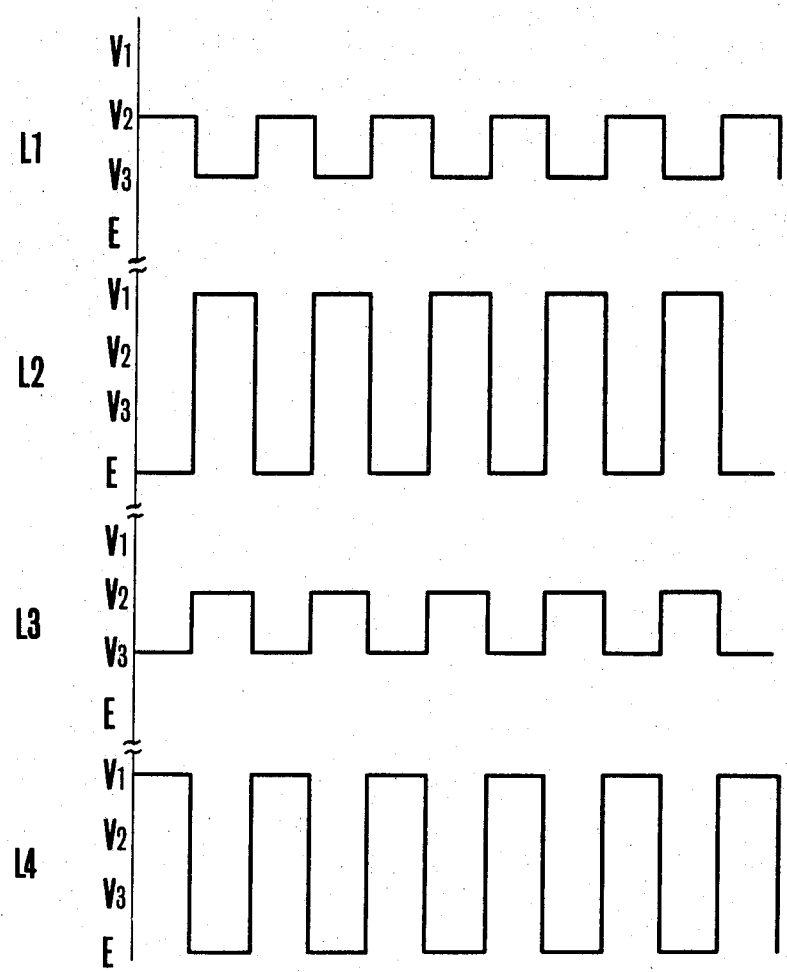
Figure 4B:
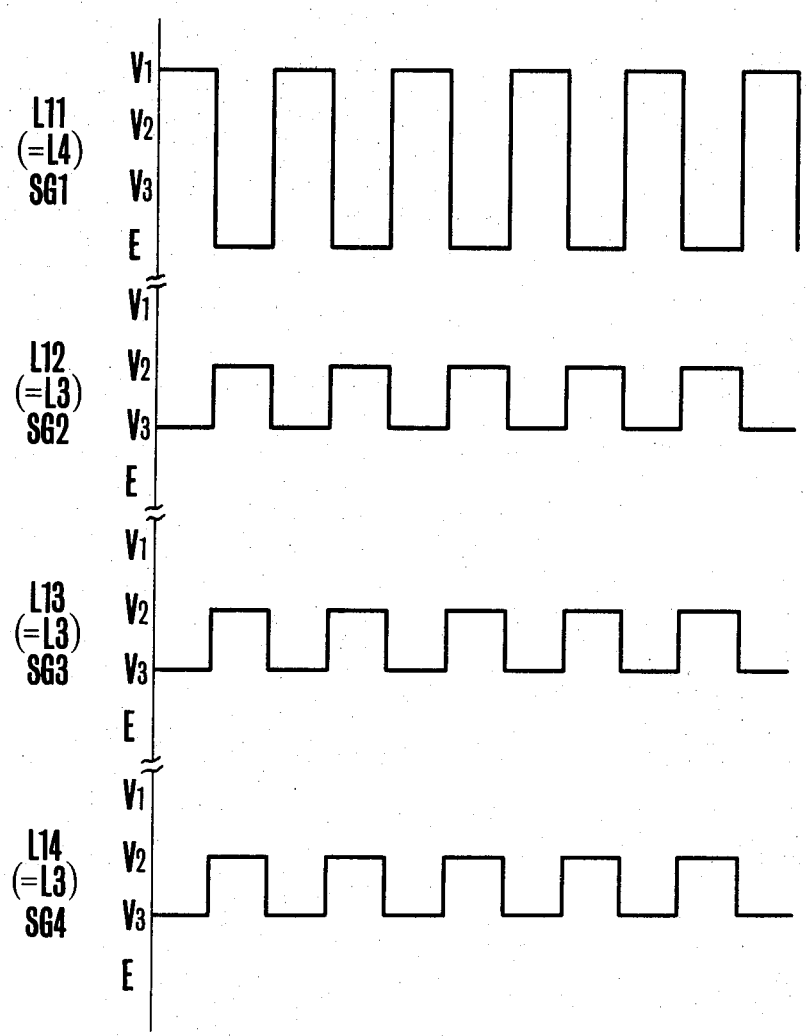
Figure 4C:
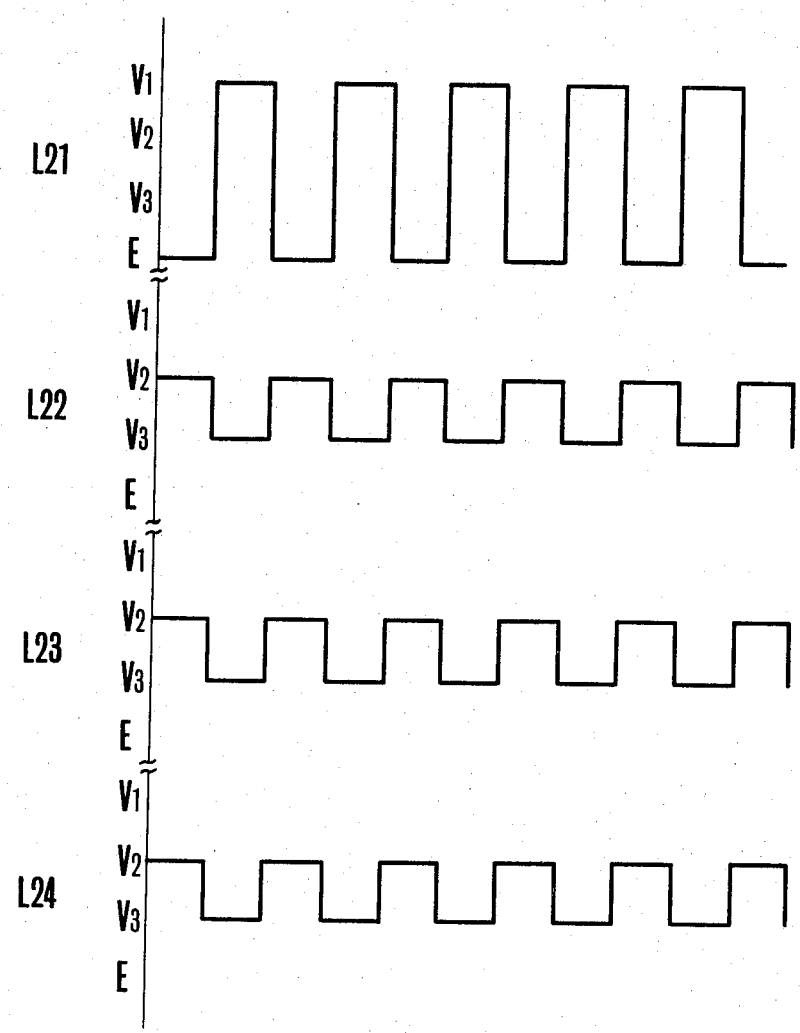

Below, the operation of the circuit constructed as explained above will be described. The output pulse voltage from the pulse generating circuit block PG is applied to the control input terminals C of the analogue switches ASW22, ASW24, ASW25 and ASW27, while a pulse voltage in the reversed phase to that of the above pulse voltage is applied to the control input terminals C of ASW21, ASW23, ASW26 and ASW28 so that the pulse voltages on the output lines L1-L4 from the analog switches ASW21-ASW28 are as is shown in FIG. 4(a).

Below, the operation of the light measuring circuit A will be explained. When the light beam from the object is incident upon the light measuring SPC22, at the output of the SPC head lamp 21 a voltage corresponding to the logarithm of the light incident upon SPC22 is produced. The output voltage is added to the ASA sensitivity information and the preset aperture value information in the adder 25 in the next step and amplified, whereby at the output a negative analog voltage is produced. This output voltage is inverted and amplified by means of the inverting amplifier 29 in the next step, at whose output an analog voltage corresponding to the logarithmically compressed value of the shutter time to be controlled is produced. This analog voltage is converted into 4 bit binary code by means of the A/D converter 32 in the next step, while a latch output is produced by the latch circuit 33, whereby the decimally converted code of the latch output is produced with the decoder.

Now, suppose that the output state of the latch circuit is [0 0 0 1] in binary code, and the output 1 of the decoder 35 is selected to be on high level (hereinafter called simply H level). Only the output 1 of the decoder 35 is on H level, while other outputs are all on L level (low level), so that only the outputs of the OR gates OR1 and OR11 are on H level, while the outputs of others OR2–OR4 and OR12–OR14 are on L level. Thus, the outputs of the inverting circuit IN1 and IN11 are brought on L level, while the outputs of the inverting circuit IN2–IN4 and IN12–IN14 are brought on H level. Thus, in this state only the analog switches ASW1, ASW4, ASW6 and ASW8 out of ASW1–ASW8 are closed, whereby on the output lines L11–L14 the pulse voltages shown in FIG. 4(b) exist. Further only the analog switches ASW12, ASW13, ASW15 and ASW17 out of ASW11–ASW18 are closed, whereby on the output lines L21–L24, the pulse voltages shown in FIG. 4(c) exist.

FIG. 4(d) shows the waveforms of the pulses applied between the segments of the liquid crystal display device LC. As is clear from the drawing, in the case of the present embodiment only the effective value of the pulse voltage applied between the segment electrode SG1 and the common electrode KS1 is V1, while that of the pulse voltage applied between other segment electrodes and other common electrodes is $\frac{1}{3}$ V1=V3. When the lighting threshold effective voltage of the liquid crystal is V-th, the relations V3<V-th<V1 and V1−2V3<V-th are fulfilled. V1 and V3 are adjusted, so that only the liquid crystal between the segment electrode SG1 and the common segment KS1 is lit, while others are not.

Namely, only the effective value between the electrodes to which the waveform on the line L4 and that on the line L2 are applied is V1, and the liquid crystal between the electrodes to which the waveform on the line L4 and that on the line L3 is selected to be lit.

Hereby, in the case of the present embodiment for the first normal phase alternating voltage and for the first reversed phase alternating voltage, the standard voltage E volt (ground level in the present embodiment) and (E+V1) volt are alternatively produced, while for the second normal phase alternating voltage and for the second reversed phase alternating voltage V2 volt and V3 volt are alternatively produced.

For V1, V2 and V3 there exist relations V1=3V3 and V2=2V3, whereby it can be said that in the case of only V1>V-th>V3 and V1−2V3<V-th the second normal phase voltage and the second reversed phase voltage are the alternating voltages, whose P—P value is V3, whereby the middle between (V1+E) volt and E volt, namely (E+V1/2) volt is center.

When then the output state of the latch circuit 33 is changed into [0 1 1 1], the level of the output 7 of the decoder 35 becomes H. Consequently, only the outputs of OR2 and OR12 become H level, while the outputs of the remaining OR gates are on L level. Thus, only the outputs of the inverting circuits IN2 and IN12 out of IN1–IN4, and IN11–IN14 are on L level, while the outputs of others are on H level. Thus, the analog switches ASW2, ASW3, ASW6 and ASW8 out of ASW1–ASW8 are closed. Further, only the analog switches ASW11, ASW14, ASW15 and ASW17 out of ASW11–ASW18 are closed. Thus, on the output lines L11, L12, L13 and L14 from the analog switches ASW1–ASW8 the output pulses shown in FIG. 5(a) exist, while only the analog switches ASW11, ASW14, ASW15 and ASW17 out of ASW11–ASW18 are closed. Thus, on the output lines L21–L24 from the analog switches ASW11–ASW18 the pulses shown in FIG. 5(b) exist.

Figure 5A:
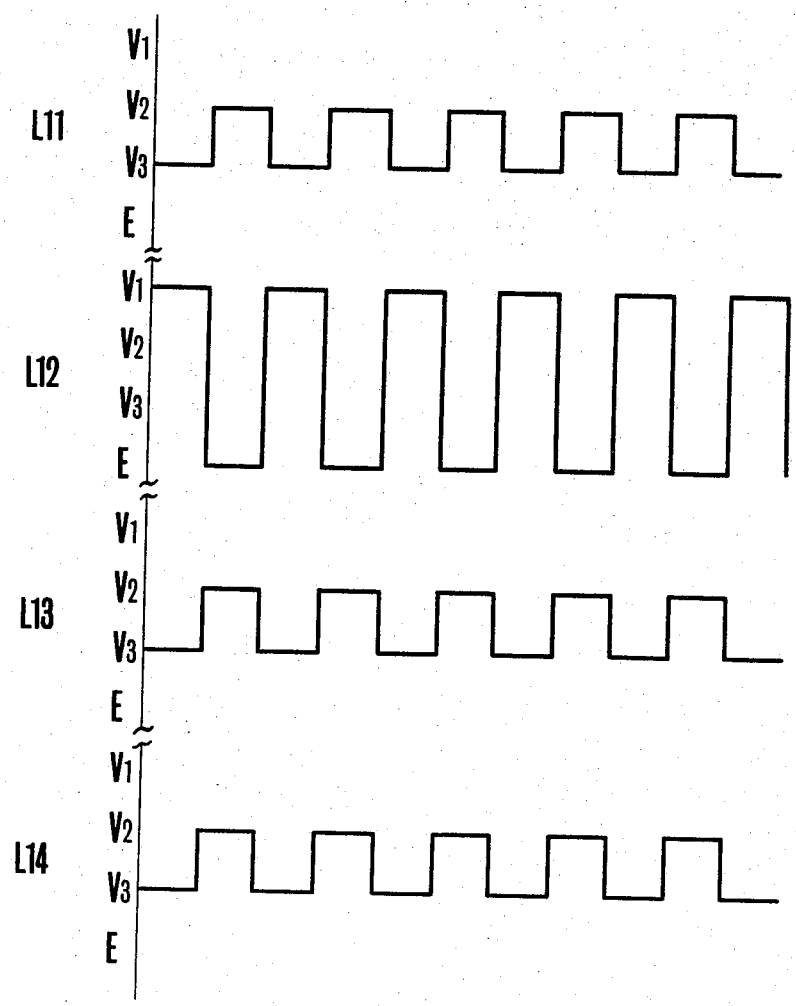
FIGS. 5(a)-(c) respectively show the voltage wave forms to be applied to another embodiment of the circuit.
Figure 5B:
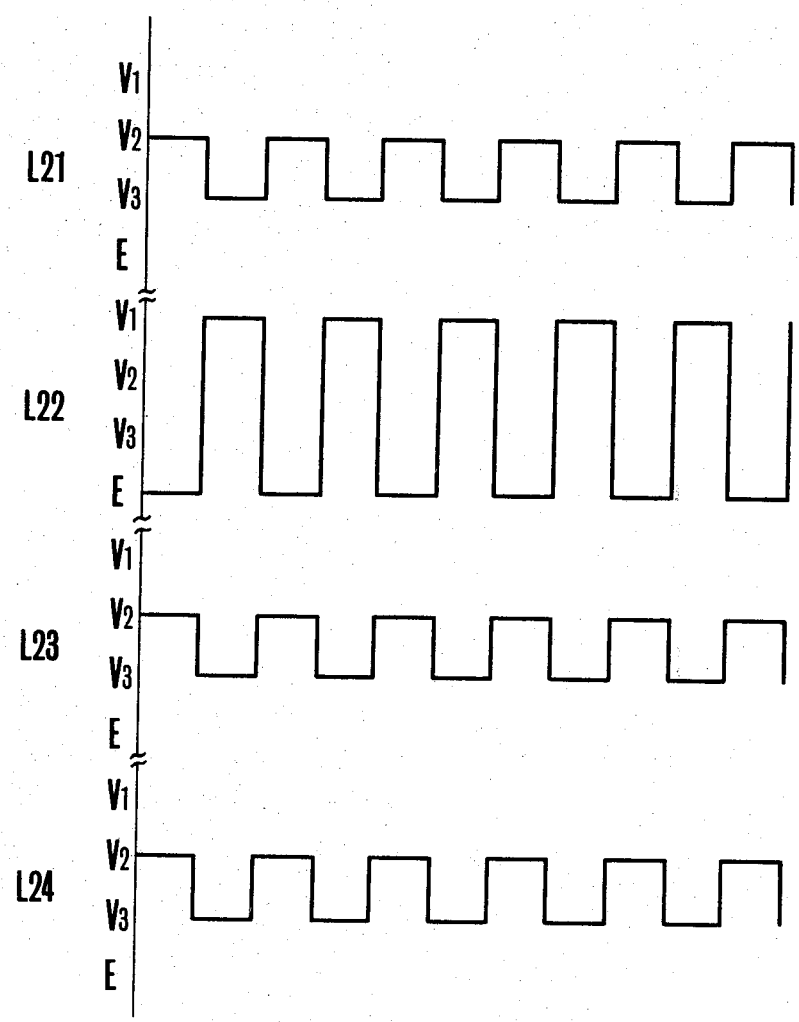
Figure 5C:
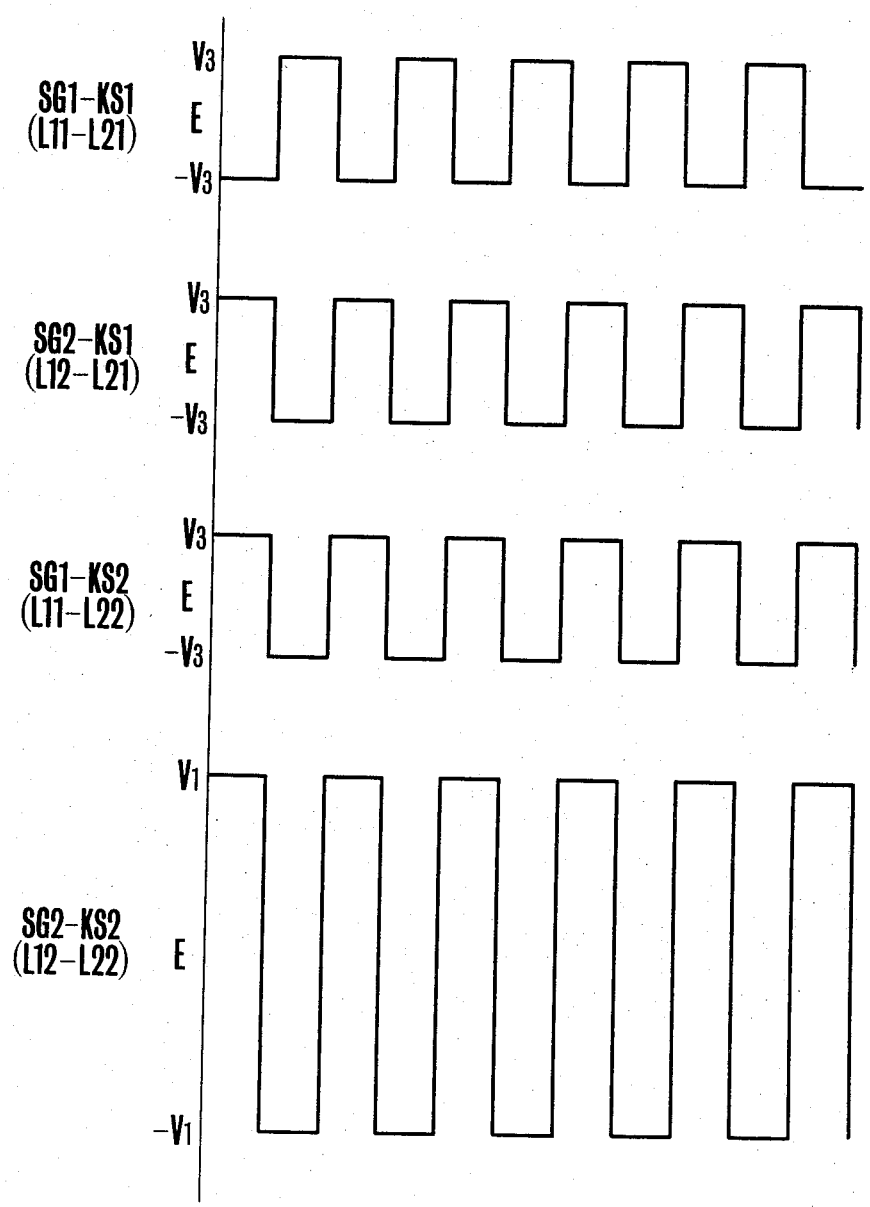

The waveforms applied between the segments of the liquid crystal LC' in this state are shown in FIG. 5(c). As is clear from the drawing, the effective value of only the pulse voltage applied between the segment electrode SG2 and the common electrode KS2 is V1, while that of the pulse voltages applied between other segment electrodes and other common electrodes is V3. Thus, only the liquid crystal between the segment electrode SG2 and the common electrode KS2 is closed and others are all not.

Namely, in this case as is clear from FIG. 3(b), the waveform on the line L4 is applied to the segment electrode SG2 and that, on the line L2 to the common electrode KS2, so that as mentioned above, only the liquid crystal between the electrodes SG2 and KS2 is selected to be lit.

When in the same way, the output state of the latch circuit 33 is changed into [1 0 1 0] in binary code, only the output 10 of the decoder 35 is on H level, so that the same logic operation as above, as is clear from FIG. 3(b), the waveforms from L2 and L4 are applied to the segment electrode SG2 and the common electrode KS3 in such a manner that only the liquid crystal between the electrode is lit.

In this way, the electrodes to which the output waveform of the line L2 and that of the line L4 are applied are decided in accordance with the decoder output decided by means of the shutter time in such a manner that only the liquid crystal between the electrode to which the output waveform of the line L2 and that of the line L4 are applied is selectively switched on. Consequently, the liquid crystal between the determined electrodes is selectively switched on in accordance with the calculated shutter time so as to carry out the dot display.

As explained above, by means of the driving system in accordance with the present invention, the pulse voltages whose P—P (Peak to Peak) values are V1 and whose phases are reversed to each other are applied to the common electrode and the segment electrode corresponding to the dot picture element to be selected, while the pulse voltages whose P—P values are $\frac{1}{3}$V1 (=V3) and whose phases are reversed to each other or the pulse voltages which are in the same phase, whereby the difference between the largest values and that between the smallest values are $\frac{1}{3}$V1 (=V3) are applied to the common electrode and segment electrode corresponding to the dot picture element not to be selected, in such a manner that by means of 8 wires, one point in the 16 dot picture elements can selectively be lit.

Although hereby the ratio of the potential at the selected point to that at the non-selected point is selected to be 3:1, it goes without saying that the larger the ratio, the less the misoperation is so far as the threshold value V-th is set between both values.

Figure 6A:
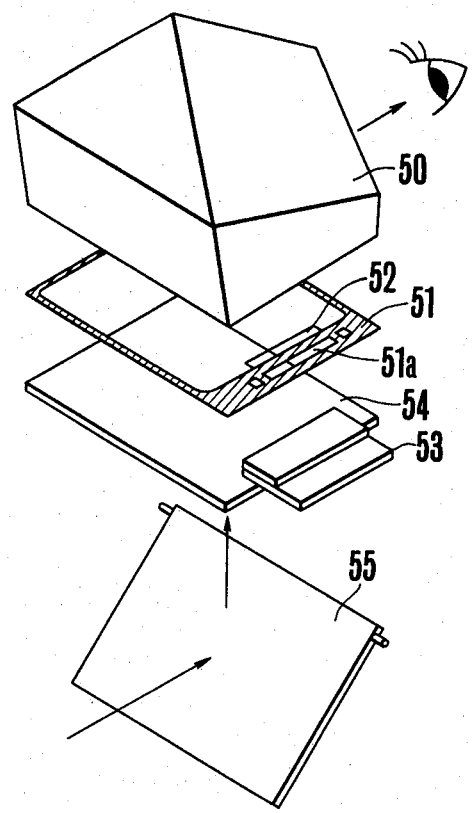
FIG. 6(a) shows an embodiment of the liquid crystal display device in accordance with the present invention arranged in the view finder of the camera.

The arrangement of the liquid crystal cell shown in FIG. 2 in the view finder optics is shown in FIG. 6. The drawing shows an example of the arrangement in the optical path of the view finder optics of the single lens reflex camera, hereby so designed that by means of a part of the passing light out of the TTL light, the display with the liquid crystal cell can be visually recognized. In the drawing 50 is a pentagonal prism, and 51 is the view field mask, in which a display window 51a for visually recognizing the display with the liquid crystal cell is provided. 52 is a transparent scale plate, cemented on the view field mask 51 and bearing the shutter time value (or the aperture value) in scale. 53 is the liquid crystal cell shown in FIG. 1, 54 is the focusing plate and 55 is the quick return reflecting mirror.

FIG. 7(a) shows the inside of the view finder constructed as above. In the drawing, 60 is the lighting portion of the above liquid crystal cell 57, now displaying that the shutter time value to be controlled is 1/125. 51b and 51c are respectively the display windows for alarming the over-exposure and the under-exposure.

Figure 6B:
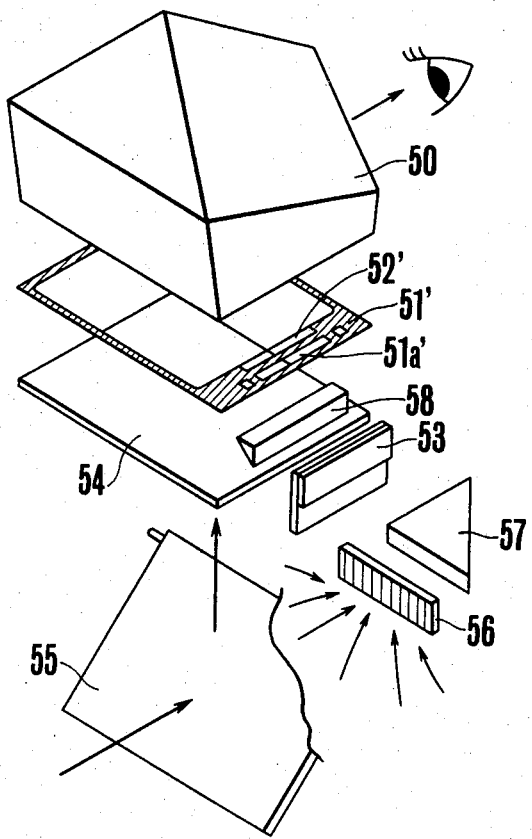
FIG. 6(b) shows a variation of FIG. 6(a).

FIG. 6(b) shows another example of the arrangement in the view finder optics of the single lens reflex camera, whereby the display with the liquid crystal cell can be visually recognized by means of the light taken out of other part than the photographing light path. In the drawing, 50 is the pentagonal prism and 51' is the view field mask, which is provided with a display window 51'a for visually recognizing the display with the liquid crystal. 52' is a transparent scale plate, being cemented on the above view field mask 51' and bearing the shutter time value (or the aperture value) in scale. 56 is the light admitting window for taking in the light from outside, being provided on the front part of the camera body and so on, 57 is a triangle prism, 58 is also a triangle prism and 53 is the liquid crystal cell between both triangle prisms. 54 is the focusing plate and 55 is the quick return reflecting mirror.

In this composition, the light coming from the window 56 is reflected by means of the triangle prism 57 toward the left, passes through the liquid crystal cell 53 and is reflected by means of the triangle prism 58 upwards in such a manner that the display with the liquid crystal cell 53 is visually recognized through the pentagonal prism 50. Then the situation in the view finder is shown in FIG. 7(b). In the drawing, 60 is the lighting portion of the above liquid crystal cell 53, hereby showing that the shutter time value to be controlled is 1/125. 51b and 51c are the windows for alarming the over-exposure and the underexposure.

In the optical system shown in FIG. 6, the liquid crystal cell shown in FIG. 2 is arranged, while the liquid crystal cell shown in FIG. 2 is driven by means of the driving circuit shown in FIG. 3 in such a manner that in accordance with the calculated shutter time value only the liquid crystal between the determined electrodes is switched on so that the shutter time value can be displayed in dot (finger) in the view finder.

Below, the second embodiment will be explained in accordance with FIG. 8 and the following drawings. In the present embodiment, the dynamic drive system and the aforementioned novel static drive system are made use of in common in such a manner that the 2 point selective display is enabled so as to display the preset information, the light measurement calculation information and other information at the same time.

Figure 8A:
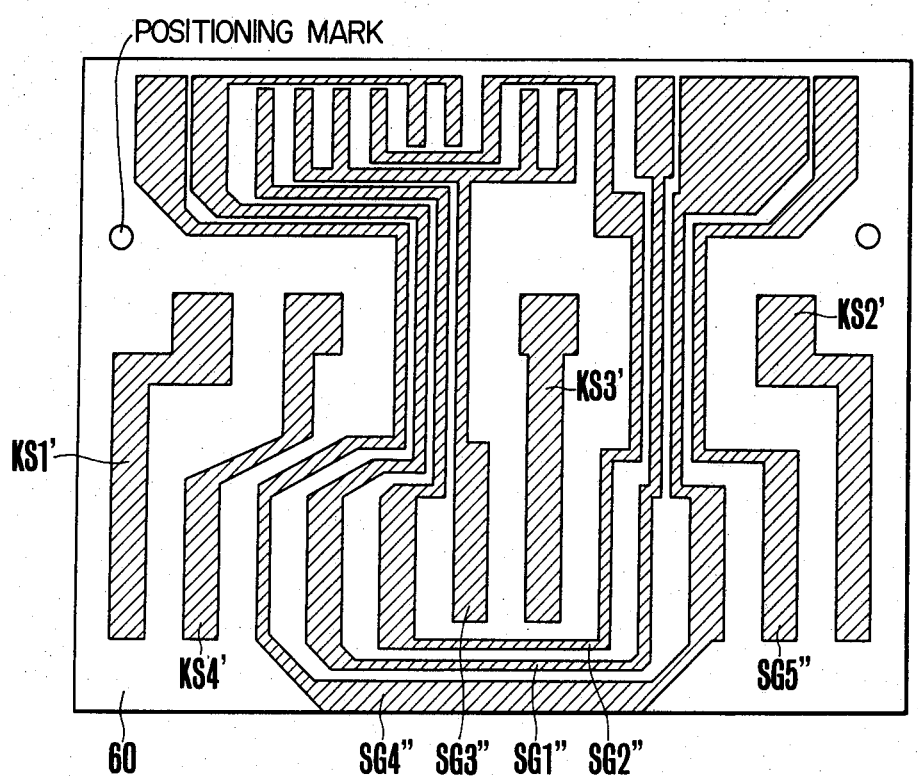
FIGS. 8(a) and (b) show the construction of the second embodiment of the liquid crystal cell in accordance with the present invention.
Figure 8B:
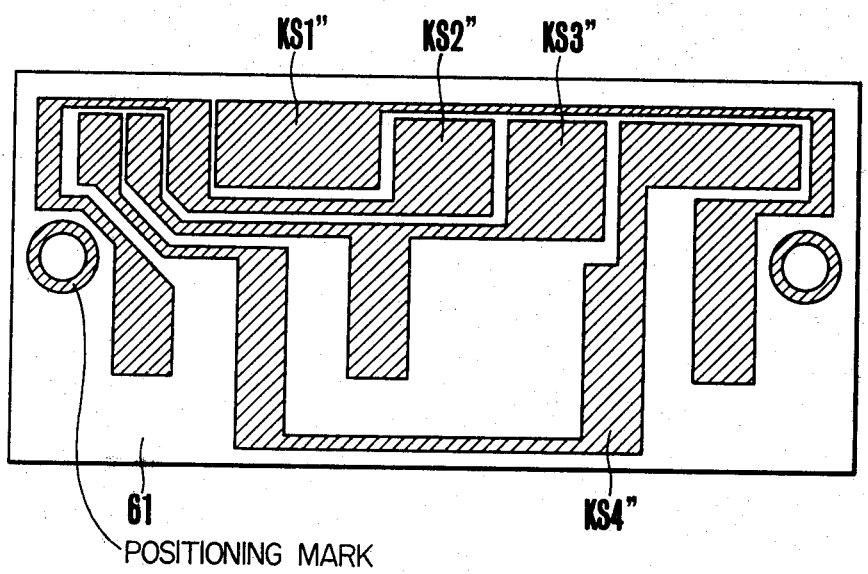

FIG. 8 shows the construction of the electrodes of the liquid crystal cell in accordance with the present embodiment. FIG. 8(a) shows an example of the electrode construction formed on the one transparent basic plate (the first transparent basic plate. In the drawing, 60 is the transparent basic plate, SG1"-SG5" are the transparent segment electrodes formed on the transparent basic plate by means of metallization and so on and KS1'-KS4' are also the transparent electrodes. On the other hand, FIG. 8(b) shows an example of the construction of the electrodes formed on the other transparent basic plate (the second transparent basic plate). In the drawing, 61 is the transparent basic plate and KS1"-KS4", the transparent common electrodes formed on the transparent basic plate by means of the metallization and so on. The above two transparent basic plates are, as in the case of the first embodiment, arranged so as to be opposed to each other, whereby a conventional liquid crystal matter is put between them, while they are sealed with a conventional spacer or the seal material and two conventional polarization plates are laid on the upper and the lower surfaces so as to complete a liquid crystal cell. Further, at the time of assembling the cell, the transparent electrodes KS1'-KS4' on the one transparent basic plate 60 and the transparent common electrodes KS1"-KS4" on the other transparent basic plate 61 are respectively brought into the conductive state by means of a connector and so on in such a manner that the connection of the liquid crystal cell to the driving circuit can be realized on the one basic plate 60 of the liquid crystal cell.

Figure 9A:
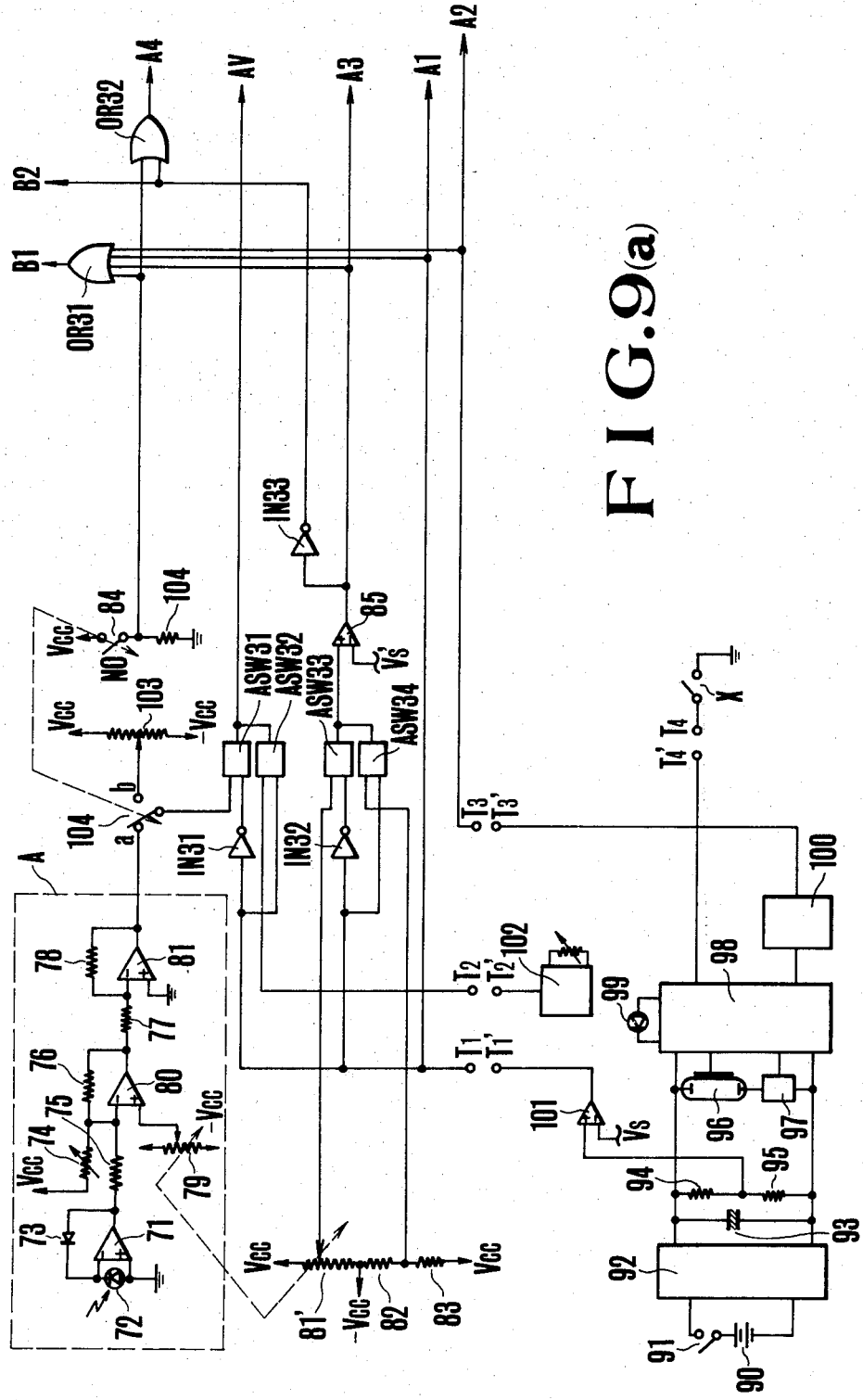
FIGS. 9(a) and (b) show the driving circuit when the liquid crystal display device in accordance with the present invention is applied to the shutter time priority camera.

FIGS. 9(a) and (b) show an electrical circuit of the present embodiments. The present circuit is an example of the liquid crystal display device in accordance with the present invention applied to the automatic exposure camera with priority on shutter time, so designed that the zone display of the preset shutter time information, the aperture value information as light measurement calculation result, the speed light charge completion signal, the speed light adjusting confirmation signal, the manual mode setting signal and the over- and the under-exposure can be displayed.

Concretely, FIG. 9(a) shows the speed light circuit, the light measurement calculation circuit in the camera body and so on. In the drawing, 71 is the operational amplifier constituting the SPC head amplifier, 72 is the photo-voltaic element (SPC) connected between both input terminal of the operational amplifier 71, and 73 is the logarithmically compressing diode inserted in the negative feed back circuit of the operational amplifier 71. 80 is the operational amplifier constituting the adder, whose inverting input terminal is connected to the output of the operational amplifier 71 through the resistance 75 and whose non-inverting input terminal is connected to the variable resistance 79 for presetting the shutter time information. 74 is the variable resistance for setting the ASA sensitivity of the film to be used, 76 is the negative feed back resistance for the operational amplifier 80. 81 is the operational amplifier for inverting amplification, whose inverting input terminal is connected to the output of the operational amplifier 80 through the resistance 77. Hereby, the non-inverting input terminal is grounded. 78 is the negative feed back resistance for the operational amplifier 81. 104 is the change over switch in operative engagement with the manual setting switch 84, so designed as to be connected to the side a in the automatic mode and to the side b in the manual mode. 103 is the variable condenser for setting the aperture information in the manual mode.

81' is the variable resistance in operative engagement with the above variable resistance 79, whereby the shorter the shutter time, the higher the potential at the intermediary top. 82 and 83 are the voltage dividing resistance for producing at the voltage dividing point the voltage corresponding to the fixed time (for example 1/60 sec.) for flash light photography. 90 is the power source for speed light, 91 is the main switch for the speed light circuit and 92 is the voltage step up DC-DC converter for stepping up the voltage of the power source when the main switch 91 is closed. 93 is the main condenser to be charged with the output of the DC-DC converter 92. 94 and 95 are the resistances for dividing the voltage between both terminals of the main condenser 93, 96 is the flash light discharge tube, 97 is the current control circuit connected in series with the flash light discharge tube 96, so as to control the current running through the tube 96, and 98 is the light adjusting trigger circuit containing the conventional light adjusting circuit and the conventional trigger circuit. 99 is the photo-voltaic element for light adjustment, while 100 is the one shot multi-vibrator, whereby when a certain determined light amount is detected with the output of the element by means of the light adjusting circuit in the light adjusting trigger circuit, the above current control circuit is actuated so as to stop the discharge. Further, at this time, also the one shot multi-vibrator 100 operates so as to produce the light adjustment confirmation signal to be transferred to the terminal A2 through the connecting terminals T'3-T3. Further, X is the conventional synchronization contact, so designed that for example, in the case of the focal plane shutter the contact X is closed when the shutter is totally opened. When this synchronization contact is closed the trigger circuit in the light adjusting trigger circuit 98 operates so as to actuate the discharge tube 96. 101 is the operational amplifier constituting the comparison circuit for producing the charge completion signal, whereby the non-inverting input terminal is connected to the voltage dividing point of the resistances 94 and 95. Further, to the inverting input terminal, the standard voltage Vs is applied.

T1-T4 are the connecting terminals on the camera body, while T'1-T'4 are the terminals at the side of the speed light device, whereby when the speed light device is mounted on the camera body, the terminals T1 and T'1, T2 and T'2, T3 and T'3 and T4 and T'4 are respectively connected to each other.

ASW31-ASW34 are the analog switches, whereby the input terminal I of the analog switch ASW31 is connected to the change over switch 104, while the control input terminal C is connected to the output of the inverting circuit IN31. Further, the input of the inverting circuit IN31 is connected to the output of the operational amplifier 101. The input terminal I of the analog switch ASW32 is connected to the aperture information signal producing circuit 102 at the side of the speed light device through the connecting terminals T2-T'2. Further, to the control terminal C the above-mentioned charge completion signal is applied through the connecting terminals T1-T'1.

Further, the input terminal I of the analog switch ASW33 is connected to the intermediary tap of the abovementioned variable resistance 81' and supplied with the preset shutter time information signal. The control input terminal C is connected to the output of the operational amplifier 101 for producing the charge completion signal through the inverting circuit IN32 and the connecting terminal T1-T'1. On the other hand, the input terminal I of the analog switch ASW34 is connected to the voltage dividing point of the resistances 82 and 83, so as to be supplied with the fixed time (1/60) for the flash light photography. Further, the control input terminal C is connected to the afore mentioned contact T1. 85 is the operational amplifier constituting the comparison circuit for detecting whether the shutter time information is in the higher range or the lower range, whose non-inverting input terminal is connected to the output of the analog switches ASW33 and ASW34. Further, to the non-inverting input terminal the standard voltage Vs' is applied. IN33 is the inverting circuit, whose input terminal is connected to the output of the afore mentioned amplifier 85. 84 is the normally opened switch for setting the manual mode, whereby it is closed when the manual mode is set. The one terminal of the switch 84 is connected to the constant voltage Vcc and the other terminal is grounded through the resistance.

OR31 is the OR gate having four input terminals, which are respectively connected to the connecting point of the afore mentioned switch 84 with the resistance 104, the output terminal of the operational amplifier 85 and the connecting terminals T1 and T2. OR32 is the OR gate having two input terminals, which are respectively connected to the connecting point of the afore mentioned switch 84 with the resistance 104 and the output of the afore mentioned inverting circuit IN33.

Now, let us call the output line of the OR32, A4, the output line of the analog switches ASW31 and ASW32 AV, the output line of the operational amplifier 85 A3, the output line of the connecting terminal T1 A1, the output line of the connecting terminal T3 A2, the output line of the OR31 B1 and the output line of the inverting circuit IN33 as B2.

Figure 9B:
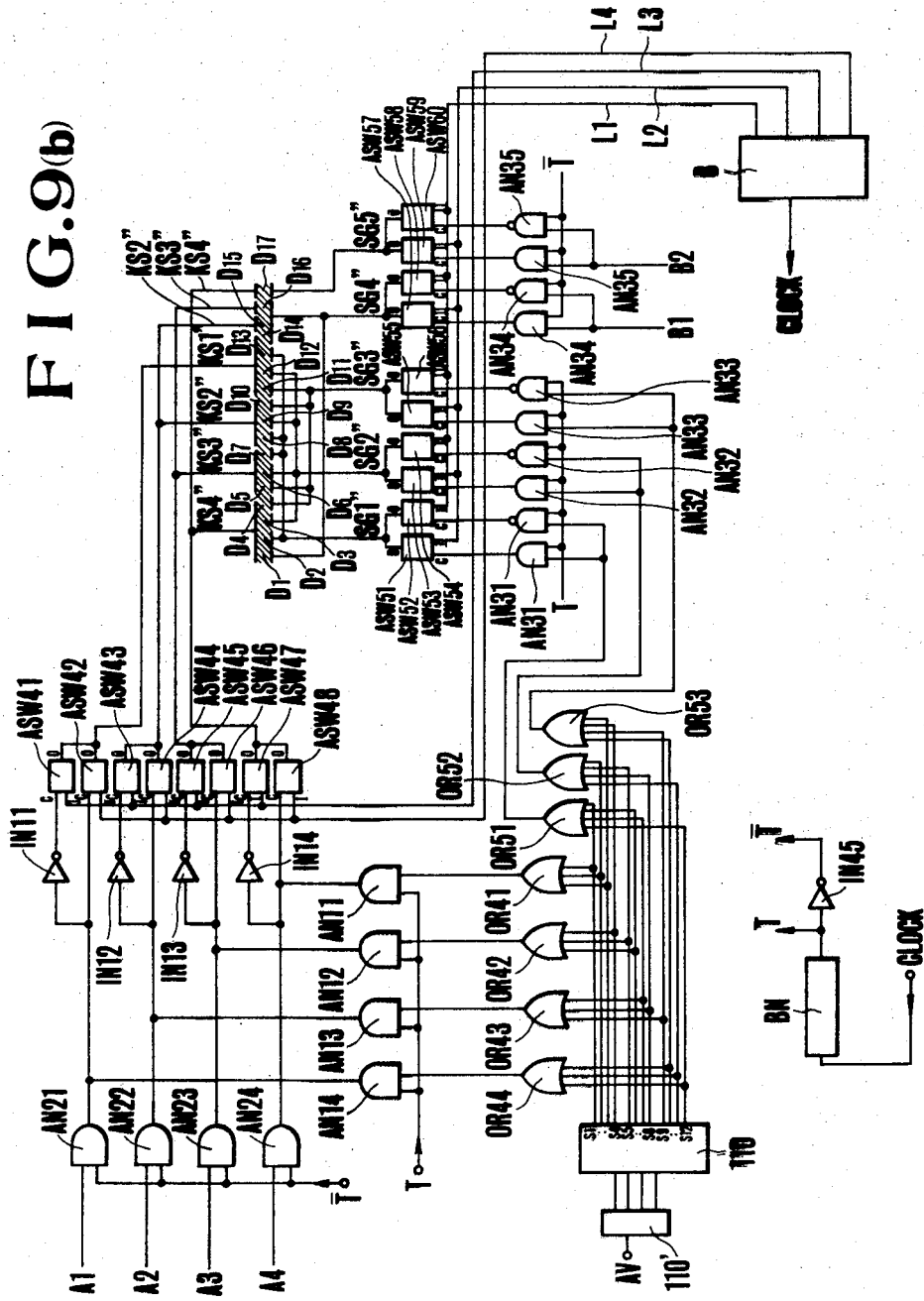
Figures 10, 11:
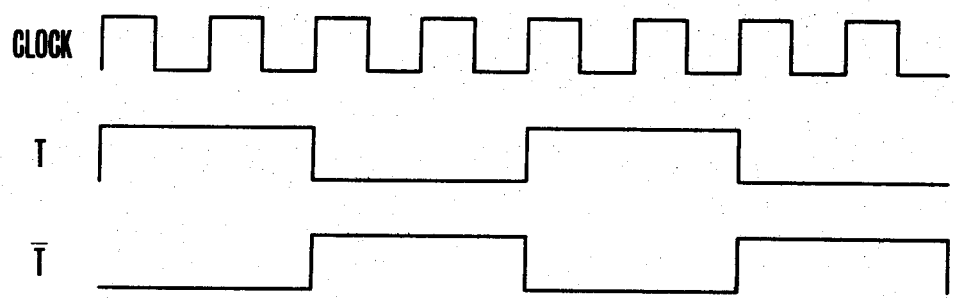
FIG. 10 shows the relation of the clock pulses to the time dividing pulses.
FIG. 11 shows the relation between the opposing portions of the crystal liquid cell and the informations to be displayed.

FIG. 9(b) shows the driving circuit of the liquid crystal cell. In the drawing, 110' is the conventional 4 bit output A/D converter and 110 is the decoder circuit, whereby the input analog signal AV from FIG. 9(a) is converted into a 4 bit digital signal by means of the A/D converter 110' and then into 12 bit decimal code. B is the pulse generating circuit block shown in FIG. 3(a), while the clock is the output of the pulse generating circuit PG in the pulse generating block B. BN is the conventional frequency dividing circuit consisting of several steps of Flip-Flop circuits, whereby to the output, the inverting circuit IN45 is connected. Now, the frequency divided output of the frequency dividing circuit BN is called T, the inverted output $\overline{T}$, whereby their wave forms are shown in FIG. 10.

Hereby, by means of the outputs T and $\overline{T}$, the time division in the present embodiment is carried out.

OR41-OR44 are the 3 input OR gates, whereby the three input terminals of OR41 are connected to the output terminals S1-S3 of the decoder 110, the three input terminals of OR42 to the output terminals S4-S6 of the decoder, the three input terminals of OR43 to the output terminals S7-S9 and the three input terminals of OR44 to the output terminals S10-S12. OR51-OR53 are the 4 input OR gates, whereby the four input terminals of OR51 are connected to the outputs S1, S6, S7 and S12 of the decoder 110, the four input terminals of OR52 to the outputs S2, S5, S8 and S11 of the decoder 11 and the four input terminals of OR53 to the outputs S3, S4, S9 and S10. AN11-AN14 are the 2 input AND gates, whereby their one inputs are connected to the outputs of OR41-OR44, while to their other inputs the output pulse T of the afore mentioned frequency dividing circuit BN are applied.

AN21-AN24 are the 2 input AND gates, whereby their one inputs are connected to the output line A1-A4 shown in FIG. 9(a), while to their other input terminals the output pulses T of the inverting circuit IN45 are applied. IN11-IN14 are the inverted circuits connected to the outputs of the AN21-AN24. ASW41-ASW48 are the analog switches, whereby the control inputs C of ASW42, ASW44, ASW46 and ASW48 are respectively connected to the outputs of AN21-AN24 and AN11. The control input terminals C of the analog switches ASW41, ASW43, ASW45 and ASW47 are respectively connected to the outputs of the afore mentioned inverting circuits IN11-IN14. AN31-AN35 are the 2 input AND gates, whereby the one input terminals of AN31-AN33 are respectively connected to the output of OR51-OR53, while to other input terminals the afore mentioned pulse signal T is applied. Further, the one input terminals of AN34 and AN35 are respectively connected to the lines B1 and B2 shown in FIG. 9(a), while to the other input terminals the afore mentioned pulse signal $\overline{T}$ is applied. NA31-NA35 are the 2 input NAND gates, whereby the one input terminals of NA31-NA33 are respectively connected to the outputs of the afore mentioned OR gates OR51-OR53, while to the other input terminals the pulse signal T is applied. Further, the one input terminals of NA34 and NA35 are respectively connected to the lines B1 and B2, while to the other input terminals the pulse signals $\overline{T}$ is applied.

ASW51-ASW60 are the analog switches, whereby the control inputs C of ASW51, ASW53, ASW55, ASW57 and ASW59 are respectively connected to the outputs of AN31-AN35, while the control inputs C of ASW52, ASW54, ASW56, ASW58 and ASW60 are respectively connected to the outputs of NA31-NA35. On the output lines L1-L4 in the afore mentioned pulse generating circuit block B, the pulse voltages shown in FIG. 4(a) exist. Further, the output line L1 is connected to the input terminal I of ASW52, ASW54, ASW56, ASW58 and ASW60, while the output line L2 is connected to the input terminals T of ASW51, ASW53, ASW55, ASW57 and ASW59. Further, the output line L3 is connected to the input terminals I of ASW41, ASW43, ASW45 and ASW47 while the output line L4 is connected to the input terminals I of ASW42, ASW44, ASW46 and ASW48.

Further, the outputs of the analog switches ASW51 and ASW52 are connected to the segments electrode SG1" of the liquid cell, the outputs of ASW53 and ASW54 to the segment electrode SG2", the outputs of ASW55 and ASW56 to the segment electrode SG3", the outputs of ASW57 and ASW58 to the segment electrode SG4" and the outputs of ASW59 and ASW60 to the segment electrode SG5".

On the other hand, the outputs of the analog switches ASW41 and ASW42 are connected to the common electrode KS1" of the liquid cell, the outputs of ASW43 and ASW44 to the common electrode KS2", the outputs of ASW45 and ASW46 to the common electrode KS3" and the outputs of ASW47 and ASW48 to the common electrode KS4".

Hereinafter, the inverters IN11-IN14, and the analog switches ASW41-ASW48, ASW51-ASW60 and so on are called gate means, while the AND gates AN21-AN24, AN11-AN14, AN31-AN35 and NAND gates NA31—NA35 input change over means.

FIG. 11 shows the construction of the electrodes of the liquid crystal cell used in the present embodiment in matrix. The figures, the letters the numerical figures shown at intersection points in the matrix shown the contents when the intersection points are lit. 1-22 display the aperature value to be controlled, ↓ shows the under-exposure, ↑ shows the over-exposure, $\sqrt{}$ indicates the speed light charge completion, OK is the speed light adjustment confirmation, M is the manual mode, HS is the shorter range of the preset shutter time and LS shows the longer range of the preset shutter time.

Below, the operation of the circuit shown in FIG. 9(a) will be explained.

It is assumed that the speed light device be not yet mounted or the main condenser 93 of the speed light device not yet fully charged, while the automatic photographing mode be set. In this state, the potential at the voltage dividing point of the resistances 94 and 95 in the speed light device circuit is low, so that the level at the non-inverting input terminal of the operational amplifier 101 is lower than that at the inversing input terminal, whereby the output is at L level. Thus, the outputs of the inverter circuits IN31 and IN32 are at H level. Further, the mode being automatic, the change over switch 104 is connected to the side a. At the output of the light measurement calculation circuit the analog voltage corresponding to the aperture value calculated from the object brightness and the shutter time set at the resistance 79 exists. To the control input C of the analog switch ASW31, a H level signal is applied from the afore mentioned inverting circuit IN31, so that the analog switch ASW31 is closed, while to the control input of the analog switch ASW32 a L level signal is applied from the operational amplifier 101 so that the analog switch ASW32 is opened. Thus, on the output line AV the analog output voltage of the light measurement calculation circuit A exists.

In the same way, to the control inputs of the analog switches ASW33 and ASW34, a H level signal and a L level signal are respectively applied, so that the analog switch ASW33 is closed, while the analog switch ASW34 is opened. Thus, to the non-inverting input terminal of the operational amplifier 85 in the next step, an analog voltage corresponding to the information of the shutter time preset on the afore mentioned variable resistance 81' is applied. When the preset shutter time is in the shorter range, the level at the non-inverting input terminal of the operational amplifier 85 is higher than that at the inversing input terminal so that the output is in H level. At this time, the output of the non-inverting circuit IN33 is in L level.

Further, the mode is automatic, so that the afore mentioned switch 84 is opened, while the level at the connecting point of the switch 84 with the resistance 104 is on L level.

Further, the main condenser 93 of the speed light device has not yet been charged, while the shutter has not released, so that the output of the afore mentioned multivibrator 100 is on L level.

As is clear from the above, the two inputs of the OR gate OR32 are on L level, so that the output line A4 is on L level, while to the output line AV the analog output signal of the light measurement calculation circuit A exists. The output line A3 is on H level, while the output lines A1 and A2 are on L level. Further, the one input of the OR gate OR31 is on H level, so that the output line B1 is on H level, while the output line B2 is on L level.

Below, the operation of the circuit shown in FIG. 9(b) will be explained. The analog signal on the afore mentioned AV line is delivered to the A-D converter 110', converted into 4 bit binary code and then into decimal code in the decoder in such a manner that the corresponding output out of the outputs S1–S12 is selected to be brought on H level. Now suppose that the output S7 is selected so as to be brought on H level, while other outputs remain on L level. In this case, the one output of the OR gates OR43 and OR51 is brought on H level so that their outputs are brought on H level. The level of the outputs of other OR gates OR41, OR42, OR44, OR52 and OR53 is low. Further the output level of the output lines A3 and B1 is also H level. Consequently, when the pulse T, namely T̄ is on the L level, the analog switches ASW41, ASW44, ASW45, ASW47, ASW51, ASW54, ASW56, ASW58 and ASW60 are closed. Consequently, only to KS2″ the output of the output line L4 in the pulse generating block B is applied, while to KS1″, KS3″ and KS4″ the output of the line L3 is applied. Further, only to the segment electrode SG1″ out of SG1″–SG5″ the output of the output line L2 is applied, while to other segment electrodes the output of the line L1 is applied.

Thus, the parts opposed to each other, of the common electrode KS2″ and the segment electrode SG1″, namely the dot "aperture value 4″ shown in FIG. 11 is lit. Further, when the pulse T, namely T̄ is on H level, the analog switches ASW41, ASW43, ASW46, ASW47, ASW52, ASW54, ASW56, ASW57 and ASW60 are closed. Consequently, only to the common electrode KS3″ out of KS1″–KS4″ the output of the line L4 is applied, while to other electrodes the output L3 is applied. Further, only to the segment electrode SG4″ out of SG1″–SG5″ the output of the line L2 is applied, while to other electrode the output of the line L1 is applied. Thus, the dot at which the common electrode KS3″ is opposed to the segment electrode SG4″, namely the dot "HS" in FIG. 11 is lit.

More specifically, the analog switches ASW51 and ASW52 are closed alternatively, to the segment electrode SG1″ the output waveform of the lines L2 and L1 in FIG. 4(a) are applied alternatively at each half cycle of the pulse T. Consequently, to the segment electrode SG1″ the waveform shown in FIG. 12(a) exists.

Figure 12A:
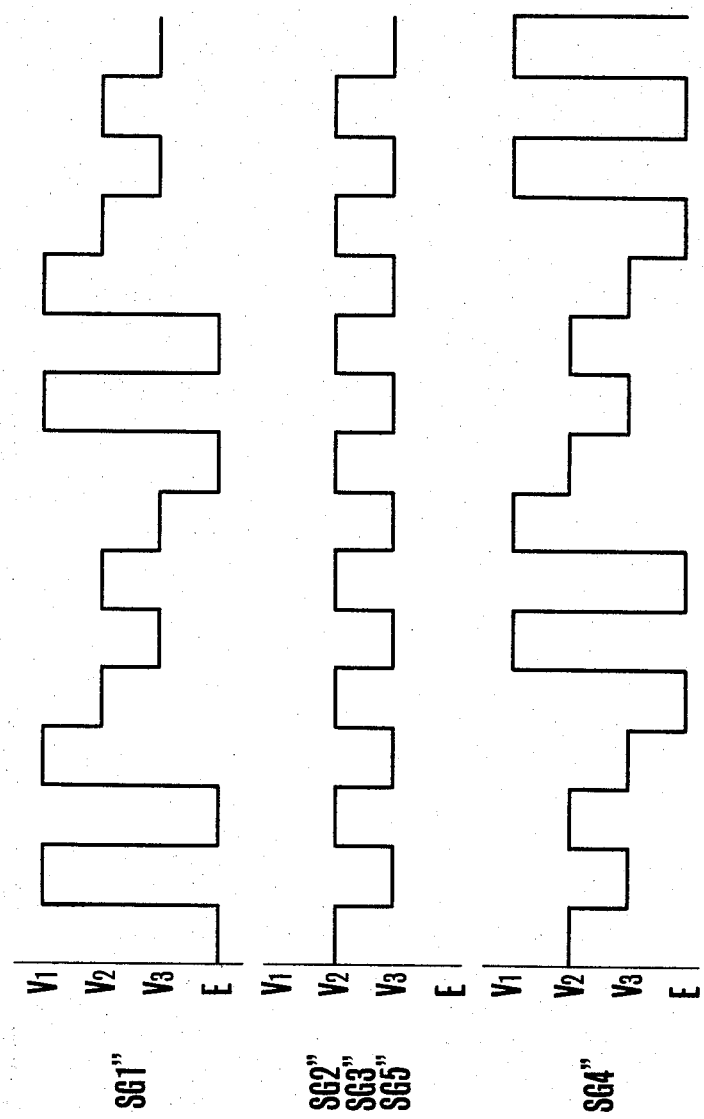
FIGS. 12(a), (b), (c-1)-(c-3) respectively show the voltage wave forms to be applied to the respective electrodes in an operation mode of the circuit shown in FIGS. 9(a) and (b).

Further, the analog switches ASW53, ASW55 and ASW59 are opened, while ASW54, ASW56 and ASW60 are closed, so that on the segment electrodes SG2″, SG3″ and SG5″ the waveform of the line L1 shown in FIG. 4(a) exists as is shown in FIG. 12(a). Further, the analog switches ASW57 and ASW58 are closed alternatively by means of the pulse T̄ so that to the segment electrode SG4″ the waveforms of the lines L1 and L2 shown in FIG. 4(a) are applied at each half cycle of the pulse T so as to produce the waveform shown in FIG. 12(a).

FIG. 12(b) shows the waveforms to the common electrodes KS1″–KS4″. The analog switches ASW41 and ASW47 are closed, while ASW42 and ASW48 are opened, so that to the common electrodes KS1″ and KS4″ the voltage waveforms existing on the line L3 and shown in FIG. 4(a) are applied. The analog switches ASW43 and ASW44 are closed alternatively so as to produce the output waveforms on the lines L3 and L4 shown in FIG. 4(a) at each half cycle of the pulse T so that to the common electrode KS2″ the waveform shown in FIG. 12(a) is applied. In the same way, the analog switches ASW45 and ASW46 are alternatively closed by means of the afore mentioned pulse T̄ so that on the common electrode KS3″ the output waveform of the lines L3 and L4 shown in FIG. 4(a) exists as is shown in FIG. 12(b).

FIG. 12(c-1)–(c-3) show the waveforms of the voltage applied between the segment electrodes SG1″–SG4″ and the common electrodes KS1″–KS4″ in this state. As is clear from the drawing, to the liquid crystal between the segment electrode SG1″ and the common electrode KS2″ and rectangular AC voltage 2V1 of P—P value is applied during the period T1 and the rectangular AC voltage 2V3 of P—P value during the period T2 and then the rectangular voltage 2V1 of P—P value during the period of T2. On the other hand, between other electrodes the rectangular AC voltage 2V3 P—P value is applied during all the period.

Figure 14:
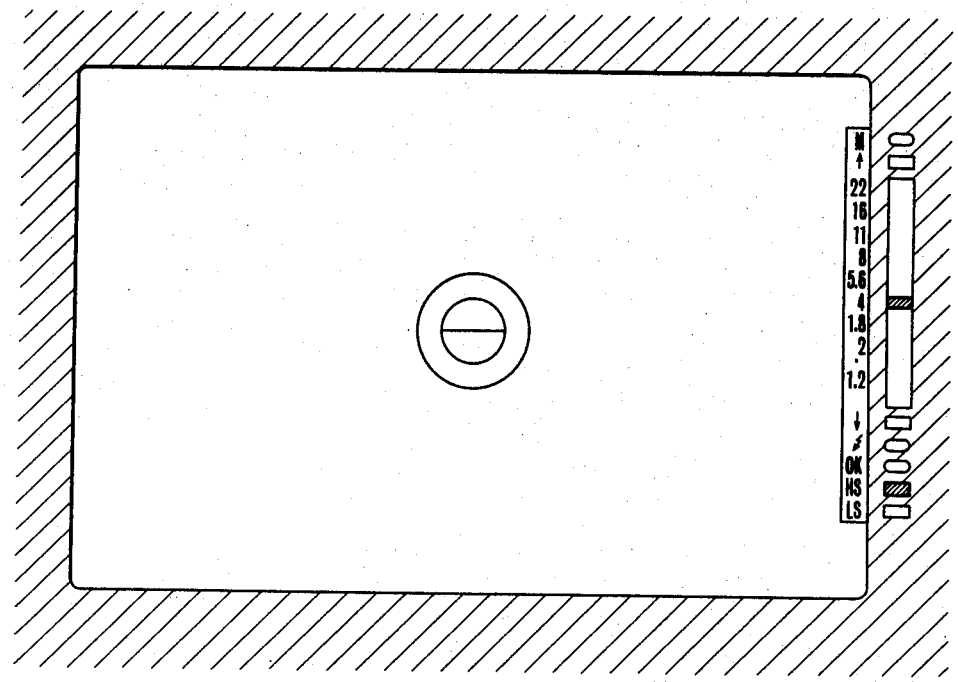
FIG. 14 is for explaining the liquid crystal display device to be driven by means of the circuits shown in FIGS. 9(a) and (b) in the view finder.

Hereby, if the effective voltage V-th of the lighting threshold value of the afore mentioned liquid crystal is selected to be between the effective value of the waveform (SG4″-KS3″) and that of the waveform (SG4″-KS2″), while (V1-2V3) is selected smaller than V-th, only the liquid crystal at (SG4″-KS3″) and that at (SG1″-KS2″) are lit, while other are not. Thus, as is clear from the matrix shown in FIG. 11, HS (shutter time in shorter range) and the aperture value 4 are displayed in the view finder. FIG. 14 then shows the display.

Below, the operation of the circuit when the speed light device has been charged in the automatic mode will be explained.

In this case, the potential at the voltage dividing point of the resistances 94 and 95 is increased, the output of the operational amplifier 101 is inverted into H level. Thus, the output of the inverting circuits IN31 and IN32 is inverted into L level, whereby the analog switches ASW31 and ASW34 are closed, while ASW31 and ASW33 are opened. Thus, on the AV line the output voltage of the aperture value information producing circuit 102 at the side of the speed light device exists. Further, to the non-inverting input terminal of the operational amplifier 85 the voltage divided by the resistances 82 and 83 is applied as the fixed time signal for shutter. The fixed time (1/60) for the speed light photography belongs to the shorter range so that the output of the operational amplifier 85 is brought on H level, while the output of the non-inverting circuit IN33 is brought on the L level. Further, the mode is automatic so that the switch 84 is opened, whereby the lower end is on L level.

In the above-mentioned state, the two inputs of the OR gate OR32 are on L level, so that the output line A4 is on L level, the output line A3 on H level, the output line A1 on H level and A2 on L level. Further the two outputs out of four of the OR gate OR31 are on H level, so that the output line B1 is on H level, while B2 is on L level. Further, on AV line the aperture value signal voltage from the aperture value information producing circuit 102 at the side of the speed light device exists. This aperture value signal corresponds to f5.6. Now, suppose that when this voltage is converted into digital signal and then delivered to the decoder 110, the output S6 of the decoder 110 is selected to be brought on H level. At this time, the output of the OR gates OR42 and OR51 is brought on H level, while the output of other OR gates are brought on L level. Thus, in this state at the output of the AND gate AN12, the afore mentioned pulse T exists, while at the output of the AND gates AN21 and AN23 the pulse T exists, whereby the output of other AND gates are on L level. Thus to the control input of the analog switch ASW41 the pulse T is applied and to that of ASW42 the pulse $\overline{T}$ is applied. Further, to the control inputs of the analog switches ASW43, ASW46 and ASW47 a H level signal is applied, while to that of ASW44, ASW45 and ASW48 a L level signal is applied.

On the other hand, to the control input of the analog switches ASW51 and ASW58 the pulse T is applied, while to the control input of the analog switches ASW52 and ASW57 the pulse $\overline{T}$ is delivered. Further, the control input of the analog switches ASW54, ASW56 and ASW60 a H level signal is applied, while to that of ASW53, ASW55 and ASW59 a L level signal is applied.

Figure 13B:
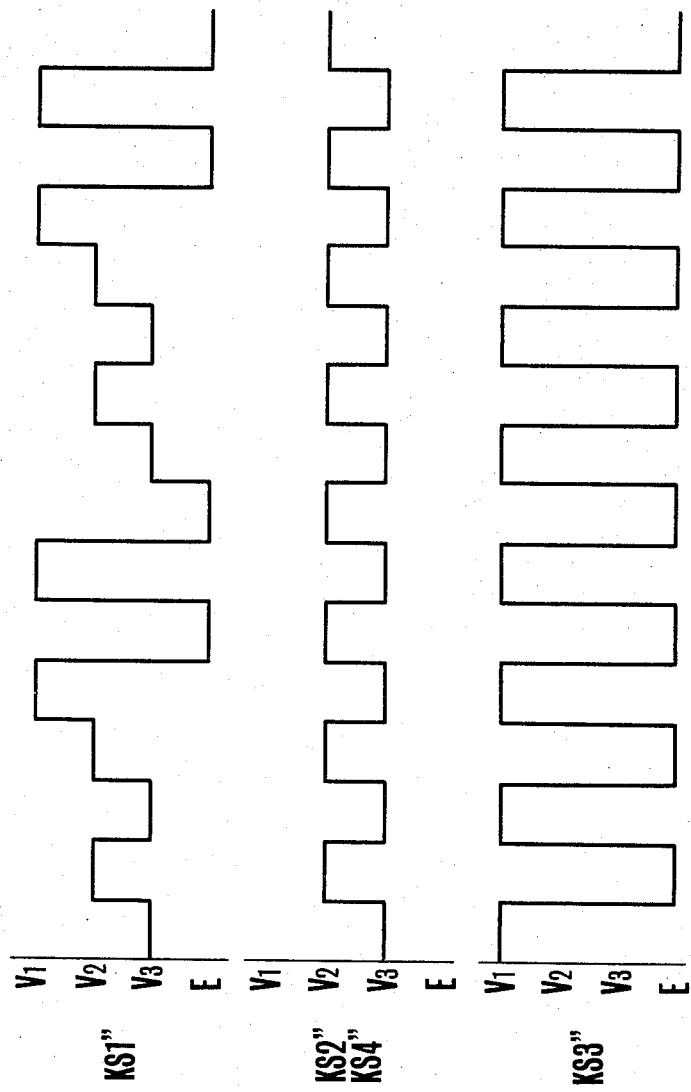
FIGS. 13(a), (b), (c-1)-(c-3) respectively show the voltage wave forms to be applied to the respective electrodes in another operation mode of the circuit shown in FIGS. 9(a) and (b).

FIG. 13(a) shows the forms of the voltage existing on the segment electrodes SG1"-SG5". Further, FIG. 13(b) shows the forms of the voltage existing on the common electrodes KS1"-KS4". Further, FIGS. 13(c-1)-(c-3) show the waveforms of the voltages applied to the liquid crystals between the segment electrodes and the common electrodes. As is clear from the drawing, the liquid crystal between the segment electrode SG1" and the common electrode KS3", that between the segment electrode SG4" and the common electrode KS1" and that between the segment electrode SG4" and the common electrode KS3" are lit. Thus, as is understood from the matrix shown in FIG. 11, the aperture value 5.6, the charge completion signal and the shutter time in higher range HS are displayed. Further, when the speed light device is actuated, the one shot multi-vibrator 100 produces pulse voltage with a certain determined width, whereby the output line A2 is on H level for a certain interval and the light adjustment OK is displayed for a certain interval.

Below, the operation of the circuit shown in FIG. 9 will be explained when the manual mode is set. At this time, as is already explained, the switch 84 is closed and the change over switch 104 is changed over to the side b. Thus, the output line A4 is on H level so that the manual mode M is displayed, while on AV line, the aperture value information signal from he variable resistance 103 manually set exists so that the manually set aperture value is displayed.

For other cases than the above, the dot parts to be lit in the liquid crystal are given in the table shown in FIGS. 15(a) and (b).

What is claimed is:

1. A liquid crystal display device for a camera comprising:
   (a) a crystal cell, said cell including a first and a transparent second basic plate, on each of which plate a plural number of transparent electrodes are provided so as to form in rows a plural number of electrode pairs to be lit on both sides of the liquid crystal matter;
   (b) pulse generating means, said means generating a first alternating voltage with amplitude V1, a first reversed alternating voltage in the reversed phase to that of the first alternating voltage, a second alternating voltage with amplitude V3 in the same phase as that of the first alternating voltage, and a second reversed alternating voltage in the reversed phase to that of the second alternating voltage, whereby, the first alternating voltage V1 is larger than the effective voltage value for lighting the crystal cell, while V3 as well as (V1-2V3) are smaller than the effective voltage value;
   (c) gate means, said means applying the first alternating voltage wave to the transparent electrodes out of those provided on the first transparent basic plate, the second reversed alternating voltage wave to other electrode on the first transparent basic plate, the first reversed alternating voltage wave to the selected transparent electrodes on the second transparent basic plate and the second alternating voltage to other transparent electrodes on the second transparent basic plate in accordance with the input signal; and
   (d) input change over means, said means changing over a plural number of input signal groups at every determined time so as to selectively delivering the input signal group to the gate means in a time dividing way in such a manner that a plural number of the electrode pairs out of those in rows in the liquid crystal cell can be lit visually at the same time.

2. A liquid crystal display device for camera in accordance with claim 1, wherein the alternating voltage produced from the pulse generating means is of rectangular form.

3. A liquid crystal display device for a camera in accordance with claim 1, wherein, in the case of the first alternating voltage wave and the first reversed alternating voltage wave, the standard voltage E volt and (E+V1) volt are produced alternatively, while in the case of the second alternating voltage wave and the second reversed alternating voltage $(E+\frac{1}{2}V1+\frac{1}{2}V3)$ volt and $(E+\frac{1}{2}V1-\frac{1}{2}V3)$ are produced alternatively.

4. A liquid crystal display device for a camera in accordance with claim 3, wherein the ratio of the voltage value V1 to that V3 is set at 3:1.

5. A liquid crystal display device for a camera in accordance with claim 1, wherein the ratio of the voltage value V1 to that V3 is set at 3:1.

6. A liquid crystal display device for a camera in accordance with claim 1, wherein the electrode pairs formed in rows in the liquid crystal cell are provided in the view finder of the camera so as to be able to visually indicate whether they are lit or not.

7. A liquid crystal display device for a camera in accordance with the claim 6, wherein a means for leading a part of the photographing light beam to the liquid crystal cell is provided.

8. A liquid crystal display device for a camera in accordance with claim 6, wherein a means for leading a light from outside of the camera body to the liquid crystal is provided.

* * * * *